United States Patent [19]
Culley et al.

[11] Patent Number: 6,000,040
[45] Date of Patent: Dec. 7, 1999

[54] METHOD AND APPARATUS FOR DIAGNOSING FAULT STATES IN A COMPUTER SYSTEM

[75] Inventors: Paul R. Culley; Joseph P. Miller, both of Cypress; Daniel S. Hull, Houston; Siamak Tavallaei, Spring, all of Tex.

[73] Assignee: Compaq Computer Corporation, Houston, Tex.

[21] Appl. No.: 08/739,687

[22] Filed: Oct. 29, 1996

[51] Int. Cl.⁶ ..................................................... G06F 11/00
[52] U.S. Cl. .............................................................. 714/31
[58] Field of Search ..................... 395/183.01, 183.06, 395/183.07; 364/264, 267, 268.9; 714/25, 30, 31

[56] References Cited

U.S. PATENT DOCUMENTS

| | | | |
|---|---|---|---|
| 4,750,177 | 6/1988 | Hendrie et al. | 371/32 |
| 5,237,677 | 8/1993 | Hirosawa et al. | 395/575 |
| 5,570,375 | 10/1996 | Tsai et al. | 371/22.3 |
| 5,588,111 | 12/1996 | Cutts, Jr. et al. | 395/182.07 |
| 5,590,354 | 12/1996 | Klapproth et al. | 395/800 |
| 5,636,341 | 6/1997 | Matsushita et al. | 395/182.11 |
| 5,640,404 | 6/1997 | Satish | 371/22.3 |
| 5,655,071 | 8/1997 | Habbe et al. | 395/183.01 |
| 5,701,409 | 12/1997 | Gates | 395/183.17 |
| 5,706,297 | 1/1998 | Jeppesen, III et al. | 371/22.3 |
| 5,708,773 | 1/1998 | Jeppesen, III et al. | 395/183.06 |
| 5,712,896 | 1/1998 | Lee et al. | 379/10 |
| 5,742,753 | 4/1998 | Nordsieck et al. | 395/182.09 |

OTHER PUBLICATIONS

Texas Instruments, *Boundary–Scan Logic IEEE Std 1149.1 (JTAG) Data Book, 5–V and 3.3–V Bus Interface and Scan Support Products*, 1997, Owensville, Missouri.

John P. Hayes, "Computer Architecture and Organization," 2d Edition, pp. 185–187, 368–375, 664–679 (1988).

U.S. application No. 08/658,750, Alan L. Goodrum et al., filed Jun. 5, 1996.

*Primary Examiner*—Robert W. Beausoliel, Jr.
*Assistant Examiner*—Stephen C. Elmore
*Attorney, Agent, or Firm*—Sharp, Comfort & Merrett, PC

[57] ABSTRACT

Faults in a computer system having circuits are managed by fault detectors connected to detect fault states of respective circuits. A fault manager associates the fault states with the respective circuits. The fault manager includes a system manager connected to identify which of the circuits is causing faulty operation in the computer system. The fault detectors associated with the respective circuits are configured to detect faulty operation of and to generate fault state information for the respective circuits. A central manager is connected to accumulate fault state information from the fault detectors. One of the circuits includes a bus, and the fault state includes a bus error condition. The bus is connected to multiple devices, and the fault manager identifies which of the multiple devices causes the bus error condition. One of the circuits includes multiple modules, and the fault manager identifies fault states of the multiple modules. The modules include state machines. One of the circuits includes an internal clock, and the fault state of the circuit includes the internal clock not functioning properly. One of the circuits includes a temperature sensor, and the fault state of the circuit includes a high temperature condition detected by the temperature sensor.

37 Claims, 22 Drawing Sheets

METHOD AND APPARATUS FOR DIAGNOSING FAULT STATES IN A COMPUTER SYSTEM

Reference is made to U.S. patent application Ser. No. 08/658,750 filed Jun. 5, 1996.

BACKGROUND

The invention relates to fault diagnosis.

Critical hardware failures in a computer system may occur in components such as a fan, a power supply, a central processing unit (CPU) or memory boards, or an I/O bus. Typically, a non-maskable interrupt (NMI) or system management interrupt (SMI) is generated to handle the failure. When an SMI or NMI is asserted, the CPU is aware that a catastrophic failure has occurred which necessitates the shut-down of the computer system.

Other types of failures can also be detected in a computer system. For example, the bus agents on a Peripheral Component Interconnect (PCI) bus include data error detection logic (e.g., parity error checker), which asserts a parity error signal PERR_ if the data error is detected. The PERR_ signal is shared among the PCI agents. Catastrophic errors on the PCI bus, such as an address parity error, can be reported by asserting a system error (SERR) signal, which may cause the NMI to be asserted to the CPU.

SUMMARY

In general, in one aspect, the invention features a computer system having circuits and a fault management system connected to independently detect fault states of respective circuits and to associate the fault states with the respective circuits. The computer system includes a mass storage device accessible by the fault management system.

In general, in another aspect, the invention features a computer system having circuits, fault detectors connected to detect fault states of respective circuits, and a fault manager to associate the fault states with the respective circuits.

In general, in another aspect, the invention features an apparatus for managing faults in a computer system having circuits. Fault detectors are connected to detect fault states of respective circuits, and a fault manager associates the fault states with the respective circuits.

In general, in another aspect, the invention features a method of managing faults in a computer system having circuits. Fault states of the respective circuits are independently detected. The fault states are associated with the respective circuits.

Certain implementations of the various aspects of the invention may include one or more of the following features. The fault management system includes fault detectors associated with the respective circuits and configured to detect faulty operation of and to generate fault state information for the respective circuits. The fault management system further includes a central manager connected to accumulate the fault state information from the fault detectors. The fault management system includes a system manager connected to identify which of the circuits is causing faulty operation in a computer system. The fault detectors provide indications to the central manager to indicate faulty operation of the respective circuits. The indications include interrupt signals transmitted between the fault detectors and the central manager. At least one fault detector monitors more than one circuit. A bus is between each fault detector in the central manager over which information associated with the faulty operation is gathered. Each bus includes a joint test action group (JTAG) bus. One of the circuits includes a bus, and the fault state includes a bus error condition. One of the circuits includes multiple modules, and the fault management system identifies fault states of the multiple modules.

Advantages of the invention may include one or more of the following. Circuits causing faulty operation can automatically be identified by the computer itself. A service provider can be provided with information about the source of the faulty operation so that the service provider can quickly perform any necessary maintenance to fix the computer system. Understanding the cause of faulty operation allows a computer manufacturer to modify the design and manufacture of the computer system to avoid such faulty operation. Using programmable fault detectors allows for greater flexibility in monitoring for faulty operation inside the computer system.

Other advantages and features will become apparent from the following description and from the claims.

DESCRIPTION

In the ensuing description, a signal mnemonic followed or preceded by a character "~", "?", or "_" indicates an inverted logic state.

Figure 1:
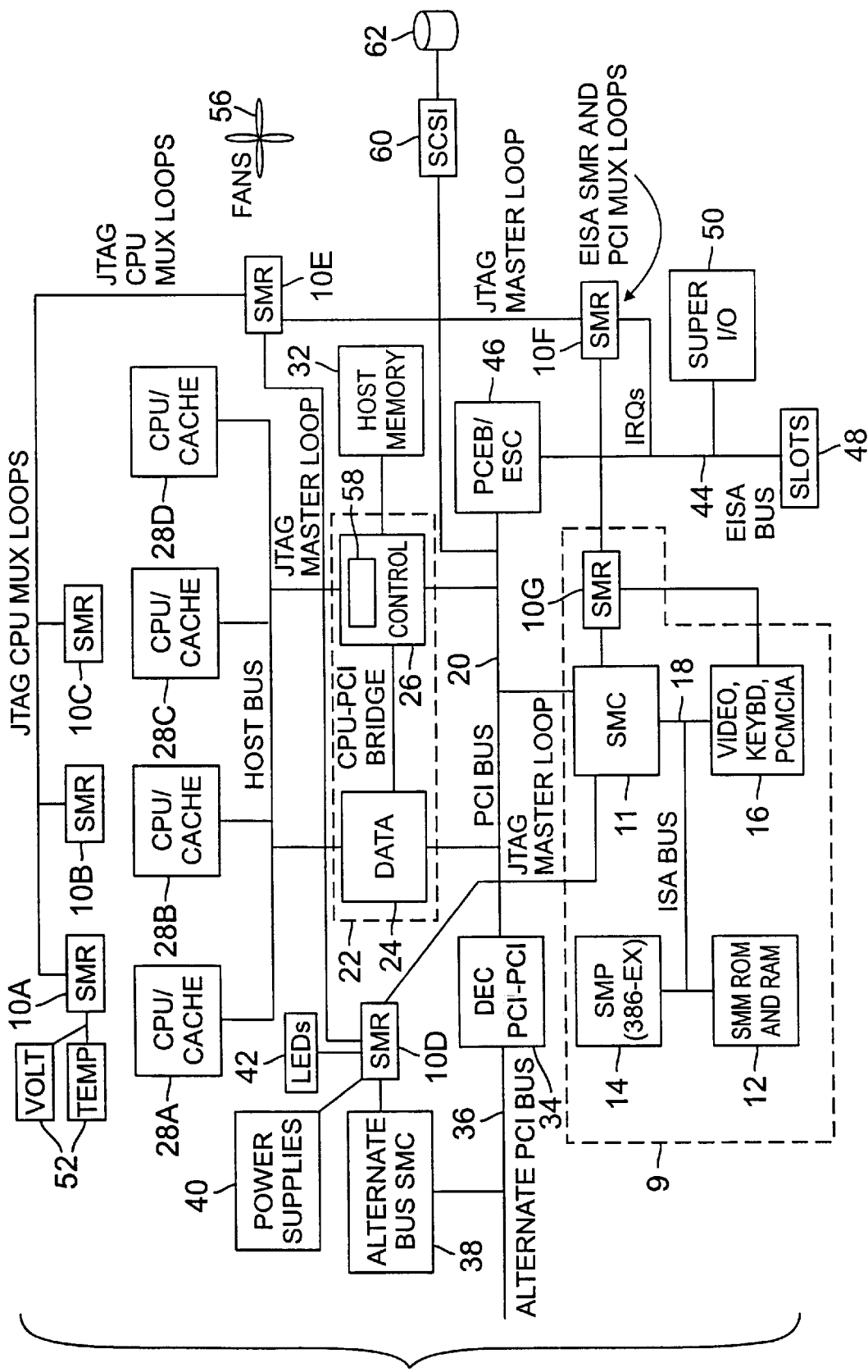
FIGS. 1 and 2 are block diagrams of a computer system having a system management module (SMM).

Referring to FIG. 1, a computer server S (comprised of the various components shown in FIG. 1) includes a system management module (SMM) 9 having a system management processor (SMP) 14 (which can be implemented with an 80386EX microprocessor from Intel Corporation), an SMM flash read-only memory (ROM) and random access memory (RAM) 12, and an SMM video controller, keyboard controller, and PCMCIA interface 16, all connected to a local bus 18 which has a bus architecture that is a subset of the Industry Standard Architecture (ISA) standard. The PCMCIA interface can be connected to a modem or to a network interface card (NIC) (not shown) for communications with a network.

Figure 7:
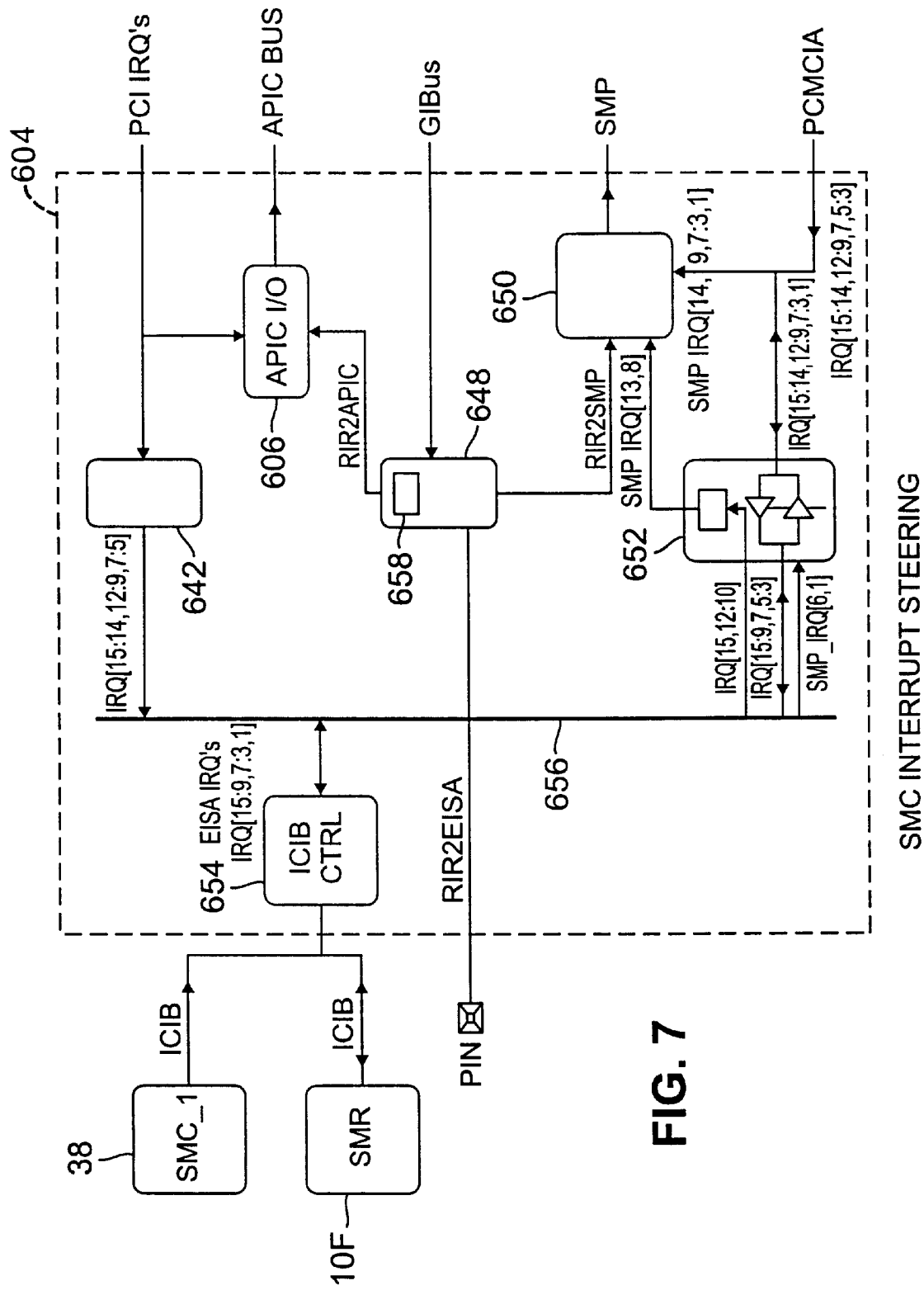
FIG. 7 is a block diagram of interrupt routing logic in the SMC chip.

A system management central (SMC) ASIC 11 and distributed system management remote (SMR) ASICs 10A–G (connected to various circuits in the server S) perform system management functions, which include computer system environment monitoring, interrupt routing, and fault diagnosis. Interrupt and error information from each SMR 10 are transferred to the SMC 11 over a serial bus GIBUS or ICIB (FIG. 7). Communications between the SMC 11 and the SMRs 10A–G occur over dedicated test buses according to a extended version of the IEEE 1149.1 (JTAG) boundary-scan test standard, as described in Texas Instruments, *Boundary-Scan Logic, IEEE Std* 1149.1 *(JTAG), 5-V and 3.3-V Bus-Interface and Scan-Support Products Data Book* (1997), which is hereby incorporated by reference. The JTAG bus is used not only for boundary scan cycles, but also for communication between the SMCs and SMRs.

The SMC 11 includes a bus bridge for controlling communication between the local ISA bus 18 and a Peripheral Component Interconnect (PCI) bus 20. The computer server S is a multiprocessor system having up to four central processing unit (CPU) cards 28A–D, each having a microprocessor with an associated external cache. The CPU cards 28A–D are connected to a host bus 30, and communications between the host bus 30 and the PCI bus 20 occur through a CPU-PCI bridge 22 having data buffers 24 and control and queue logic 26. The control and queue logic 26 is connected to host memory 32.

Also connected to the PCI bus 20 is a SCSI controller 60 connected to a set of hard disk drives 62. In addition, the PCI bus 20 can be connected to a PCI-PCI bridge 34, which is connected to a secondary PCI bus 36 on the other side. A secondary SMC 38 is connected to the secondary PCI bus 36. Devices on the PCI bus 20 can also communicate with devices on an Extended Industry Standard Architecture (EISA) bus 44 through a PCI-EISA bridge 46, which can be implemented with the 82374SB EISA System Component (ESC) and the 82375SB PCI-EISA bridge (PCEB) from Intel. The EISA bus 44 includes expansion slots 48 and a super I/O chip 50 (which includes interface ports for a serial port, a parallel port, a floppy disk drive, and a keyboard). Six EISA bus devices (including the super I/O chip 50, the PCI-EISA bridge 46, and devices connected to the slots 48) are connectable to the EISA bus 44.

The SMRs 10A–G receive error and interrupt information from the various sources to which they are connected. The SMRs 10A–C are located on a host board, which includes the CPU cards as well as temperature and voltage sensors 52 connected to the SMR 10A. Error and interrupt information passed to the SMRs 10A–C can result from over-voltage and high temperature conditions, correctable or uncorrectable data or address errors on the host bus 30, host bus errors and host bus protocol violations. A host bus watcher 58 is included in the control and queue logic 26 for determining if a bus error or protocol violation has occurred on the host bus 30 and for reporting that error or violation to one of the SMRs 10A–C.

The SMR 10D is connected to the secondary SMC 38 and receives error and interrupt information from power supplies 40 and a temperature sensor 44. Status information associated with the SMR 10D can be displayed by light-emitting diodes (LEDs) 42, with the LEDs 52 connected to some of the output or GPIO pins of the SMR 10D.

The SMR 10E is connected to a fan speed sensor 54 for monitoring the speed of the fan 56. Fan failure is reported as an interrupt to the SMR 10E. The SMR 10F is associated with the EISA subsystem and receives EISA interrupt lines IRQ from the EISA bus 44. The SMR 10F also includes an EISA bus watcher for monitoring EISA bus error conditions.

The SMR 10G is located in the SMM 9 and is connected to the video controller, keyboard controller, NIC, and modem 16. Errors and interrupts in the SMM 9 are communicated through the SMR 10G.

Figure 2:
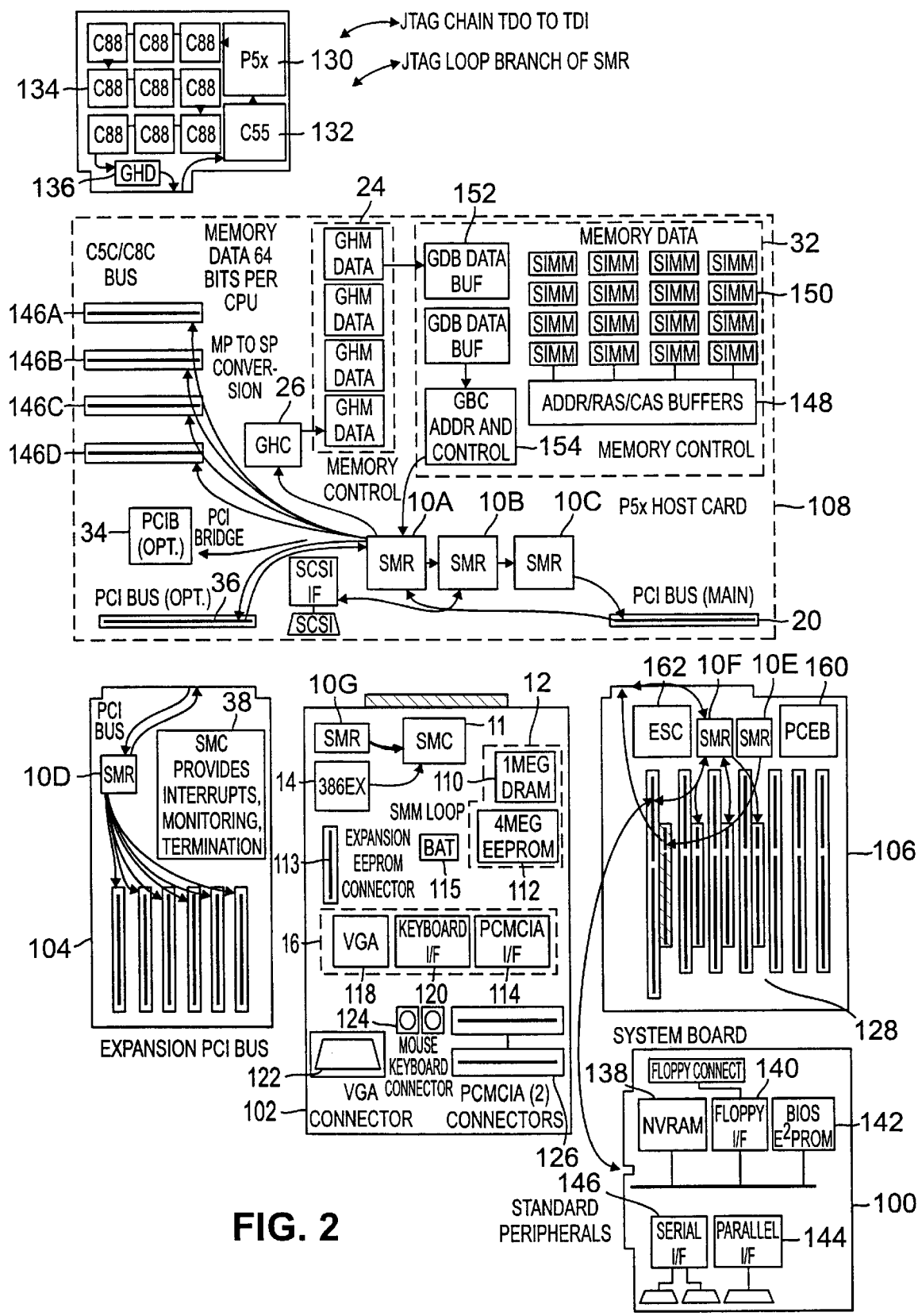

Referring to FIG. 2, the computer server S includes a host card 108, an SMM card 102, a secondary PCI card 104, and a system board 106. In the SMM card 102, the SMM memory 12 includes a dynamic random access memory (DRAM) 110 (having a capacity of 1 MByte, for example) and an electrically erasable programmable read-only memory (EEPROM) 112 (having a capacity of 4 MBytes, for example). The EEPROM storage capacity is expandable by adding additional EEPROM chips through an expansion EEPROM connector 113. A video controller 118, a keyboard interface 120, and an PCMCIA interface 114 are connected to a video connector 122, mouse and keyboard connectors 124, and two PCMCIA connectors 126, respectively.

The EEPROM 112 contains power on self test (POST) code executable by the SMP 14 to initialize and test the SMM 9 as well as the entire computer system S if the host is unable to power on properly from system BIOS. The SMP 14 can access the host memory 32 and can communicate with the operating system as well as application programs running under the operating system.

On the host card 108, CPU connectors 146A–D are connectable to CPU cards 28A–D, respectively. Each CPU card 28 includes a microprocessor 130 (such as a Pentium P5 processor from Intel), cache memory chips 134, a cache controller 132, and a data buffer 136. The host memory 32 includes address and control logic 154 for generating address and RAS_ and CAS_ control signals to the single in-line memory modules (SIMMs) 150 through address, RAS_, and CAS_ buffers 148. Memory data is routed to the host bus 30 through memory data buffers 152.

The system board 106 contains the EISA bus 44 and the SMRs 10E and 10F. Peripheral devices 100 are connected to the system board 106 through the super I/O chip 50 and include a non-volatile random access memory (NVRAM) 138, a floppy interface 140, an EEPROM 142 for storing system BIOS, a serial interface 146, and a parallel interface 144.

Figure 3:
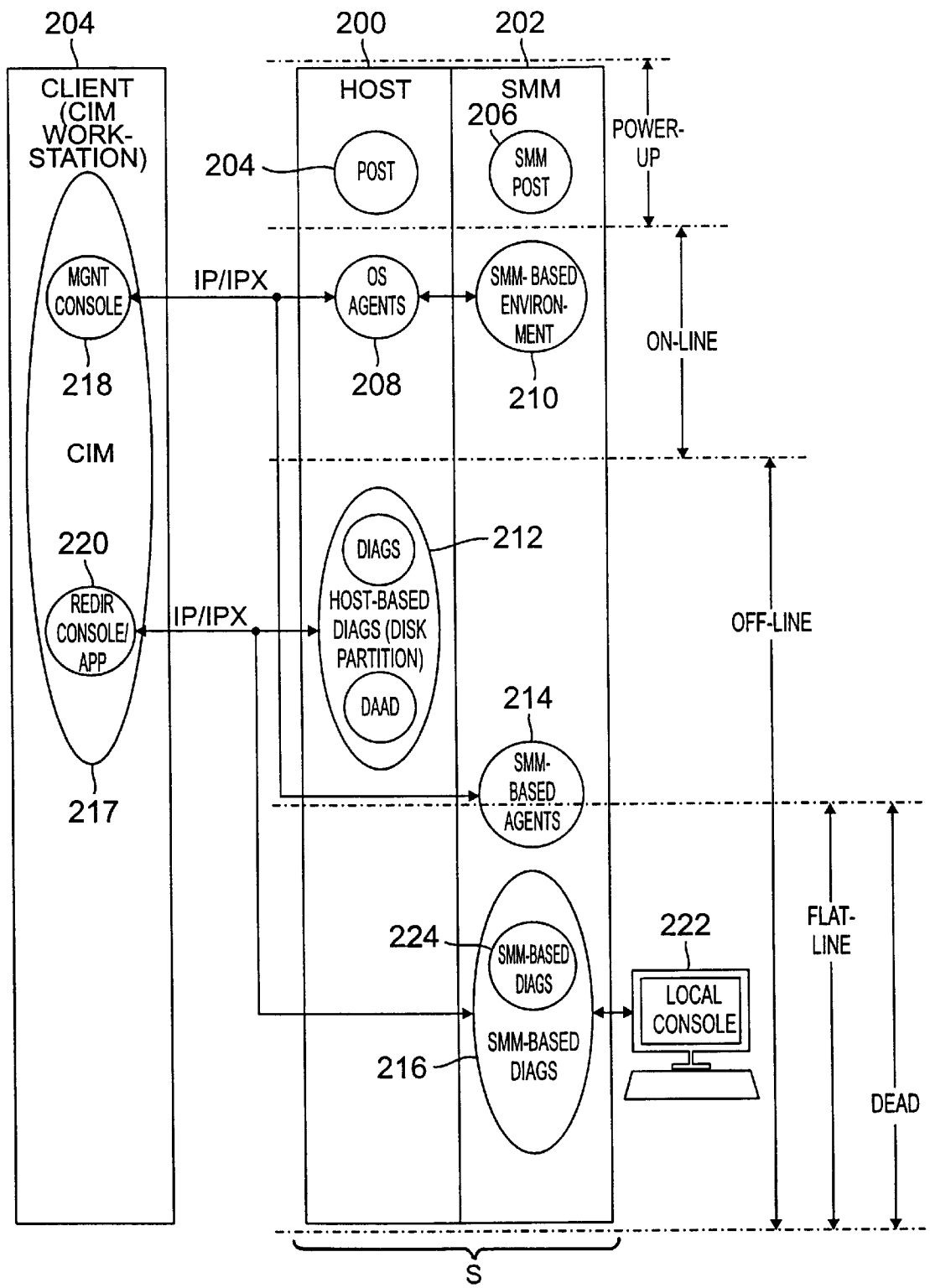
FIG. 3 is a block diagram of software running in the computer system.

Referring to FIG. 3, the computer server S runs host software 200 (e.g., NOS, DOS, Windows, utilities) and SMM firmware 202. The interface between the host software 200 and the SMM firmware 202 is the shared memory 12 residing in the SMM 9. The host software and SMM firmware can be in one of four states: power-up, in which system power-on self test (POST) routines and SMM POST routines run to power up the computer server S; on-line, in which host operating system applications 208 are running and communicating with an SMM-based environment program 210 running in the SMM 9 as well as with network programs; off-line, in which the CPUs in the computer server S are unable to execute the main operating system because they are unable to boot from disk; and flat-line/dead, in which the host system 200 has become inoperable.

In the off-line state, host-based diagnostic software 212 can perform diagnosis of the disk subsystem (which includes the hard disk drives 62). The diagnostic program 212 collects information (by issuing commands to the disk controller 60) and stores information (including controller and ROM versions, location of drives, failed disk drive, spare drive availability, and monitor and performance information) associated with any disk problem.

In the off-line state, the SMM 9 appears as an alternate boot device to the host. When the host processor (one of CPU cards 28A–D) attempts and fails to boot the primary boot partition (the hard disk dives 62), the system (DOS) partition, the floppy disk drive, or a CD-ROM drive (not shown), the SMM 9 acts as the next host boot device.

If the host software is unable to execute any code at all because of some other faulty condition (e.g., failure of the CPU cards 28A–D, host bus 30 hanging, EISA bus failure, failure of the SCSI controller 60), then the computer system S is in the flat-line/dead state. Unless the power supplies 40 are also inoperational, they enter a low power mode for keeping the SMM board 102 operational and for lighting LEDs.

In both the off-line or flat-line/dead states, the SMM firmware 202 (through SMM-based agents 214) can alert a remote computer of a faulty condition in the computer system S. The alert includes an SNMP trap (through the NIC) or a modem page (through the modem). The SMM firmware 202 includes SMM-based test programs 216 for identifying the source of a faulty condition. The test programs 216 include a diagnostic program 224 executable by the SMP 14 for identifying the source of the faulty condition.

Figure 4:
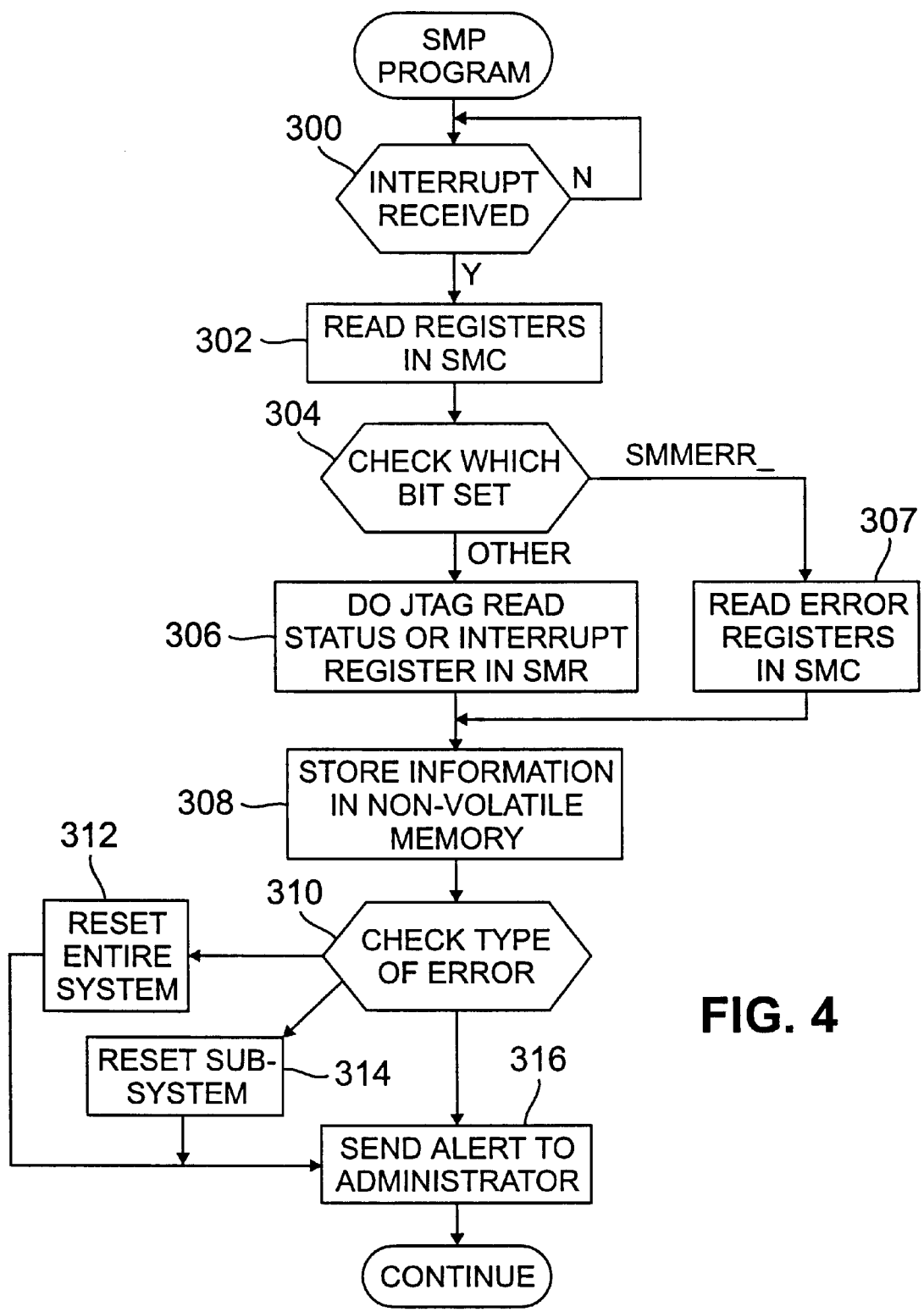
FIG. 4 is a flow diagram of diagnostic software routine running on a system management processor in the SMM.

The SMM-based diagnostic program 224 is invoked by the SMP 14 in response to interrupts from the SMRs 10A–G and other interrupt sources (such as an error indication signal in the SMC 11). Such interrupts are received by the SMC 11 and mapped as an interrupt to the SMP 14. Referring to FIG. 4, if the diagnostic program 224 detects 300 receipt of an interrupt, it accesses a remote interrupt register 518 and a HOST2SMPIRQ register 512 (FIG. 9A), as well as a status register storing the state of an error signal SMMERR_ (FIG. 13), in the SMC 11 to check 304 which interrupt has been asserted. If at least one of the bits in the registers 512 and 518 is set, the diagnostic program 224 performs 306 a JTAG read of the status and interrupt registers of the SMR 10 associated with the changed value of the remote interrupt register 518 or HOST2SMPIRQ register 512. If instead the signal SMMERR_ is determined to be active low, the diagnostic software 224 reads the contents of error registers 912 (FIG. 13) in the SMC 11 to determine which module in the SMC 11 has failed.

The contents of the SMR's status and interrupt registers or the contents of the error registers 912 are then stored 308 in the NVRAM 138. Next, the diagnostic program 224 checks 310 the type of fault detected.

There are three general types of faults: system-type critical faults requiring that the entire computer server S be shut down (e.g., fan failure, overheating, all CPU cards 28A–D failed, SCSI controller 60 failed); sub-system critical faults in which a sub-system in the server S has to be shut down (e.g., one EISA slot device has failed); and non-critical faults (e.g., SMC 11 has failed).

If a system-type critical fault is detected, then the entire computer server S is reset and shut down 312. If a sub-system critical fault is detected, then the faulty sub-system is reset 314. From steps 312, 314, or 316, the diagnostic program 224 sends 316 an alert along with information associated with the faulty condition to an administrator or service provider (located locally or remotely). Such information includes the NVRAM log information associated with the device as well as any diagnosis information generated by the diagnostic program 224 (e.g., type of fault, source of fault, etc.).

Locally, the SMM firmware 202 can take control of a local console 222 (including its keyboard, video, and mouse) (FIG. 3) to allow a service provider to view the diagnosis information, even if the computer system S is powered down. Remotely, the SMM firmware 202 communicates to an SNMP-based management console 218 through the SMM management agents 214. The service provider views the information using a remote-redirected service console 220 or an SNMP console. The remote or local service console 220 or 222 allows the service provider to reboot the computer server S.

Figure 5:
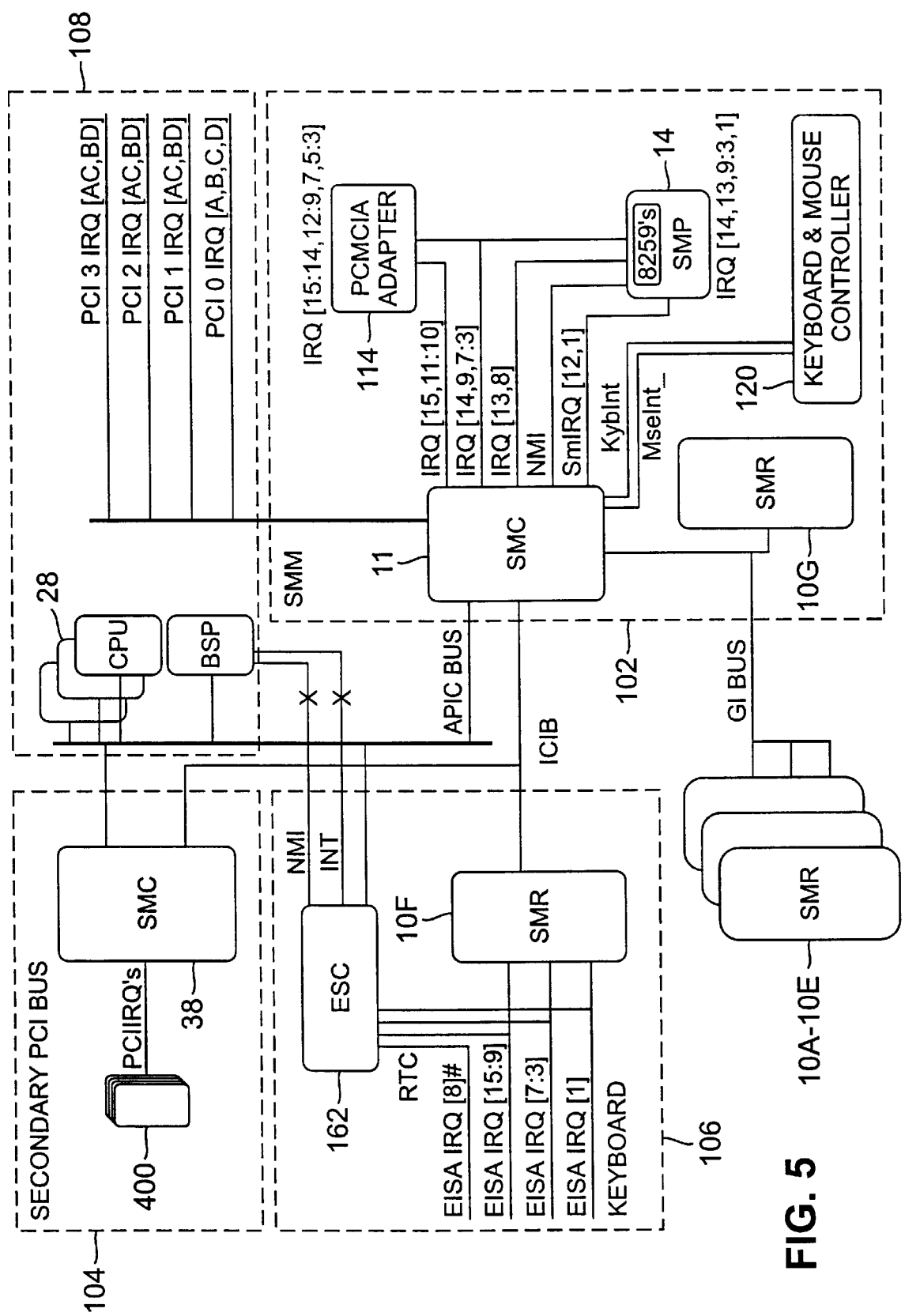
FIG. 5 is a block diagram of the computer system showing the interrupt routing scheme.

Referring to FIG. 5, the SMC 11 receives interrupts from the SMRs 10A–E and 10G over the bus GIBUS. The SMC 11 uses time division multiplexing to gather the SMR interrupts over the bus GIBUS, which is a serial bus having 2 signals: a data signal GID (which is attached to a weak pull-up resistor), and a clock signal GICLK. The bus GIBUS includes up to 16 time slots. Sixteen GICLK periods are needed for the SMC 11 to accumulate all received interrupts.

The SMR 10F (the EISA SMR) transmits interrupts over a serial bus ICIB, which is also connected to the SMC 38. The bus ICIB is a bi-directional serial link which carries EISA interrupts to and from the SMM 9, passes PCI interrupts from the secondary PCI bus 36 to the SMM 9 and the EISA board 106, and passes PCI interrupts from the primary PCI bus 20 to the EISA board 106. The bus ICIB (which has a protocol similar to the bus GIBUS) includes 16 time slots, with each time slot consisting of 4 clock periods to carry one interrupt message.

Figure 6:
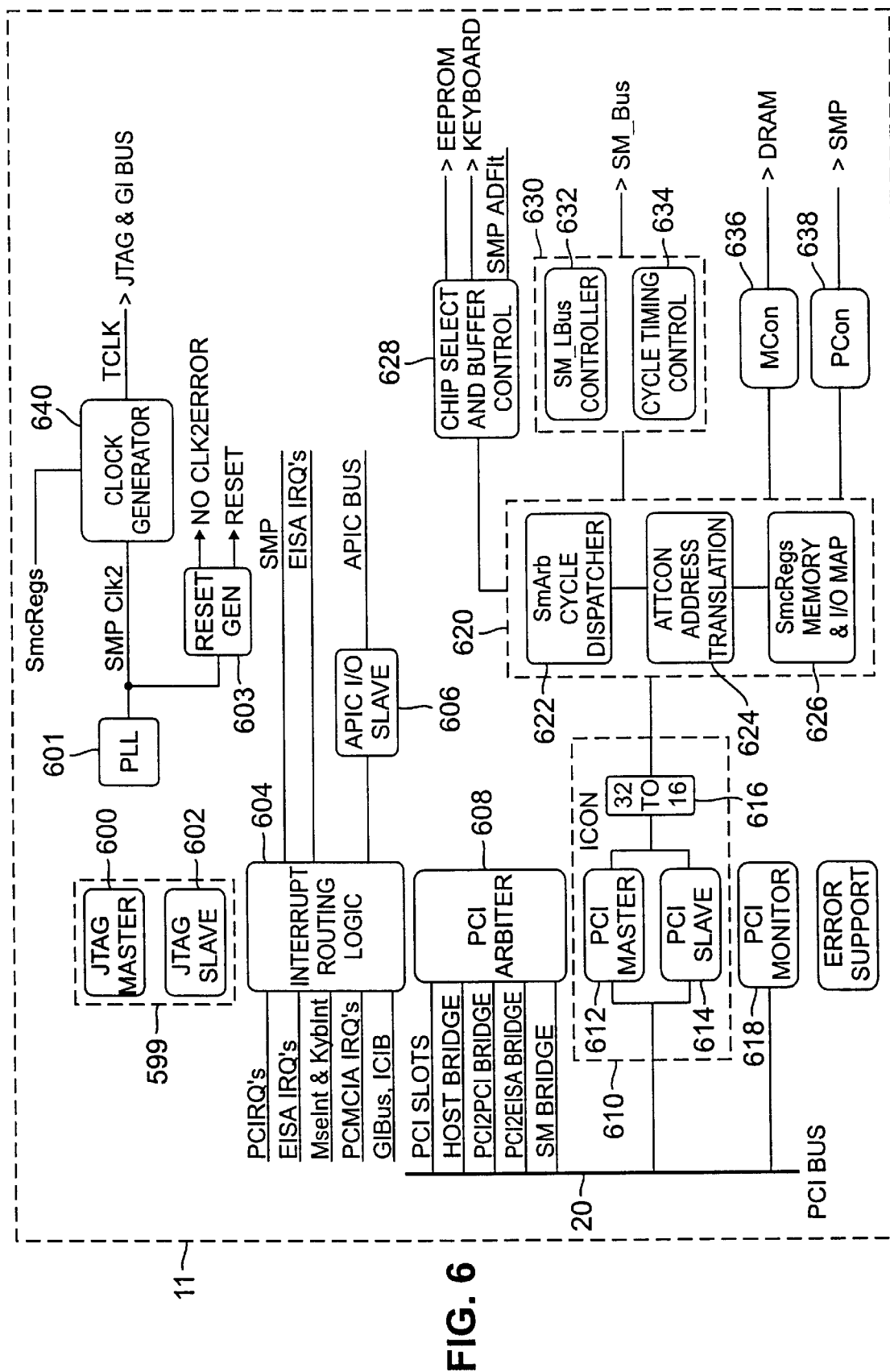
FIG. 6 is a block diagram of a system management central (SMC) chip in the SMM.

Referring to FIG. 6, the SMC 11 includes a JTAG interface 599 having a JTAG master controller 600 and JTAG slave controller 602 for communicating with the SMRs 10A–G. The JTAG interface 599 minimizes overhead of the SMP 14 by providing a command and data queue allowing the SMP 14 to pipeline several commands to the JTAG port. A clock generator 640 generates a test clock TCLK synchronized to an internal SMP clock CLK2 (generated by a phase locked loop or PLL 601). The test clock TCLK drives the JTAG buses, as well as provides the clocking for the serial buses ICIB and GIBUS.

A reset generator 603 provides reset signals for the rest of the SMC 11. The reset generator 603 also includes logic for monitoring the clock CLK2. If the clock CLK2 stops toggling, the reset generator 603 asserts a signal NOCLK2 ERROR to indicate the clock failure condition.

An interrupt routing block 604 receives interrupts from various sources in the computer server S, including PCI interrupts PCIIRQ[15:0]_, EISA interrupts EISA_IRQ [15:0]_, a mouse interrupt MSEINT_, a keyboard interrupt KYBINT_, a PCMCIA interrupt PCMCIA_IRQ_, and the serial buses ICIB and GIBUS. The interrupts are mapped by the interrupt routing block 604 to an interrupt signal SM_IRQ13 provided to the SMP 14 and to EISA interrupts EISA_IRQ[15:0]_. In addition, the interrupt routing logic 604 provides advanced programmable interrupt controller (APIC) I/O interrupt signals to an APIC I/O slave 606, which is connected to an APIC bus for communicating interrupts between the multiple CPU cards 28A–D.

A PCI bus arbiter 608 determines which master is granted control of the PCI bus 20: the PCI slots (e.g., the SCSI controller 60), the host bridge 22, the PCI-PCI bridge 34, the PCI-EISA bridge 46, or the SMC 11. A PCI controller block 610 includes a PCI master 612 and PCI slave 614 for performing master and slave functions on the PCI bus 20. As the PCI bus is 32 bits wide and the ISA bus is 16 bits wide, a 32-to-16-bit converter divides PCI cycles into two ISA cycles and vice versa. The 16-bit converted cycles are provided to an SMC control block 620, which includes an SMC arbiter 622 (for controlling access to the ISA bus by the local ISA bus devices), an address translation block 624 (for translating PCI addresses to ISA addresses and vice versa), and SMC configuration registers 626 (for defining the configuration information of the SMC 11, including the memory and I/O space of the local ISA bus 18, and the modes of the SMC 11). The SMC configuration registers 626 also includes error registers 912 (FIG. 13) for indicating if an error in one of the modules in the SMC 11 has occurred. For example, state machines in the PCI arbiter 608, the PCI master block 612, the PCI slave block 614, and other modules might enter illegal states. In addition, the SMC 11 includes logic for monitoring the local ISA bus 18 for an error condition. By notifying the SMP 14 of such error conditions, the diagnostic program 224 can identify which module has failed in the SMC 11 or if the local ISA bus 18 has failed.

The SMC 11 also includes a local bus controller 630 having an ISA bus controller 632 and cycle timing controller 634 for generating and receiving ISA transactions on the local ISA bus 18. A memory controller 636 controls access to the DRAM 110, and a processor controller 683 provides the interface between the SMC 11 and the SMP 14.

Referring to FIG. 7, the interrupt routing block 604 includes a PCI interrupt block for receiving interrupts from the primary PCI bus 20 and mapping them to EISA interrupt signals IRQ[15,14,12:9,7:3,1]. A GIBUS controller 648 and an ICIB controller 654 receive interrupt information coming from the SMRs 10 over the buses GIBUS and ICIB, respectively. In addition, the ICIB controller 649 can transmit EISA interrupts over the ICIB bus to the SMR 10F. The GIBUS controller 648 includes a time slot select counter 658 (which generates signals GISLOT[3:03]) for pointing to the "current" time slot out of the possible 16 time slots on both buses GIBUS and ICIB.

The SMC 11 gathers all interrupts from SMRs 10A–10E and 10G into a remote interrupt register 518 (which generates signals RIR[15:0]_), and gathers interrupts from the EISA SMR 10F into a HOST2SMPIRQ register 10F (which generates signals HOST2SMPIRQ[15:0]_). The SMP 14 may individually mask the time slot specific interrupts. The remote interrupt register 518 is accessible by both the SMP 14 and a host CPU 28 over the PCI bus 20. The bit-wise OR of signals RIR[15:0]_is a signal RIR, which is a level-sensitive IRQ to ensure detection of an interrupt while another one is being serviced. The GIBUS controller 648 routes the signal RIR to the SMP 14 by driving a signal RIR2SMP, which is received by an SMP interrupt block 650. The SMP interrupt block 650 converts the signal RIR2SMP from a level-sensitive signal to an edge-triggered signal SM_IRQ13 to the SMP 14. The GIBUS controller 648 can also route the signal to the EISA board 106 via an interrupt signal RIR2EISA or to the APIC I/O slave 606 via an interrupt signal RIR2APIC.

An interrupt mapping block 652 maps EISA IRQ signals to PCI IRQ signals (and vice versa). The interrupt mapping block 652 also maps EISA IRQ signals (including the HOST2SMIRQ[15:0]_ from the ICIB controller 654 to the SMP interrupt SM_IRQ13).

Once the SMP 14 receives the interrupt SM_IRQ13, it can mask the signal SM_IRQ13 to prevent receiving another interrupt. The masking operation physically takes place inside the SMP 14. In response to receipt of the interrupt SM_IRQ13, the SMP 14 identifies the interrupt source by first reading the remote interrupt register 518, the HOST2SMPIRQ register 512, and the status register storing the signal SMMERR_.

Figure 8:
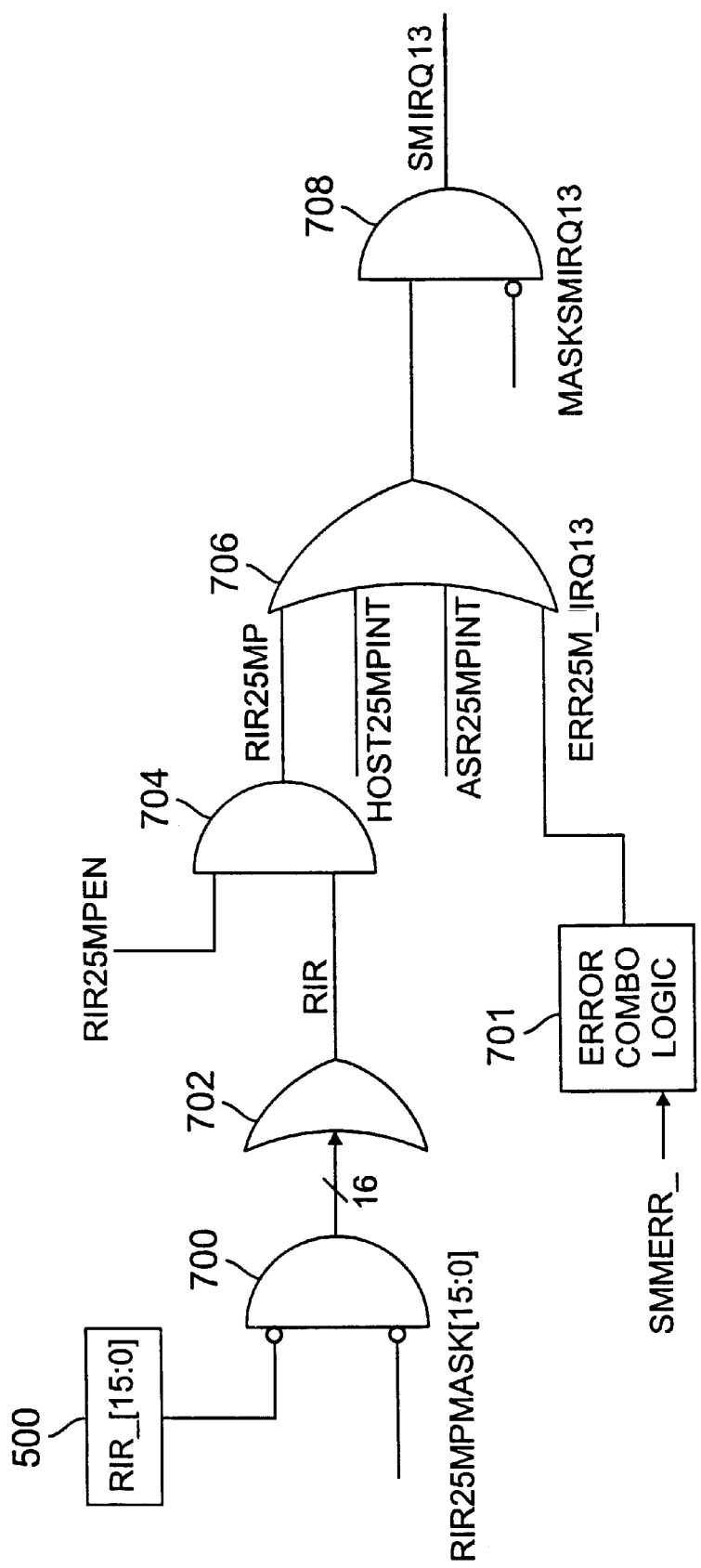
FIG. 8 is a logic diagram of circuitry for generating an interrupt to the SMP.

Referring to FIG. 8, the interrupt signal SM_IRQ13 provided to the SMP 14 is generated by an AND gate 708, whose inputs receive the output of an OR gate 706 and the inverted state of a signal MASKSMIRQ13 (for masking the SM_IRQ13 signal). The inputs of the OR gate 706 receive signals ERR2SM_IRQ13 (indicating certain errors have occurred in the SMC 11 or on the local ISA bus 18), ASR2SMPINT (indicating an ASR event has occurred), HOST2SMPINT (indicating an interrupt from the host to the SMP 14 has been received), and the output of an AND gate 704. The AND gate 704 receives a signal RIR2SMPEN (asserted high to enable interrupts from the SMRs to be transmitted as SM_IRQ13 to the SMP 14) and the output of a 16-input OR gate 702. The inputs of the OR gate 702 receive outputs of 16 NOR gates 700, which receive the signals RIR[15:0]_ and signals RIR2SMPMASK[15:0]. Each AND gate 700 performs an AND operation of signals RIR[X]_ and RIR2SMPMASK[X], X=0–15. Thus, if an SMR 10 sets any of the RIR[15:0]_ bits high, and the particular bit is not masked by the corresponding mask signal RIR2SMPMASK[X], then the AND gate 708 asserts the signal SM_IRQ13 high.

Figure 9A:
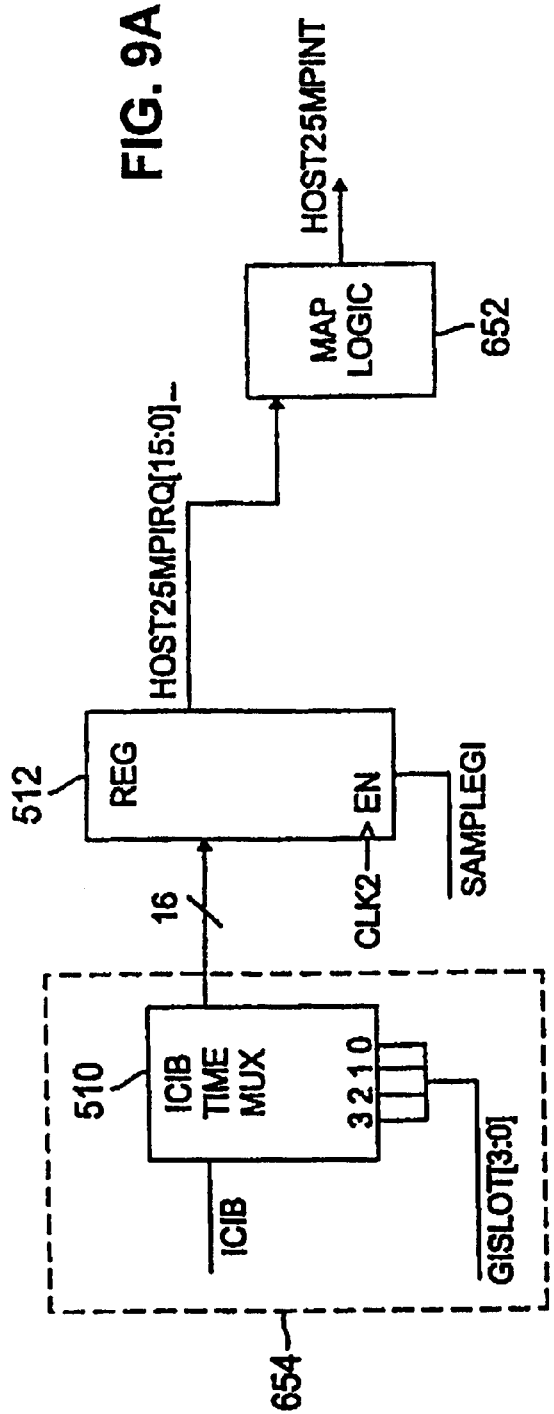
FIGS. 9A and 9B are logic diagrams of circuitry in the SMC chip for receiving interrupts.

Referring to FIG. 9A, the ICIB controller 654 includes a time multiplexor 510 for receiving the ICIB serial bus. Based on the value of the time slot count signals GISLOT [3:0], the time multiplexor 510 generates 16 output bits to the HOST2SMPIRQ register 512, which loads the signals on the rising edge of CLK2 if a sample signal SAMPLEGI is asserted. The output signals HOST2SMPIRQ[15:0]_are provided to the interrupt mapping block 652, which generates a signal HOST2SMPINT for those EISA interrupts to be mapped to the SMP 14.

Figure 9B:
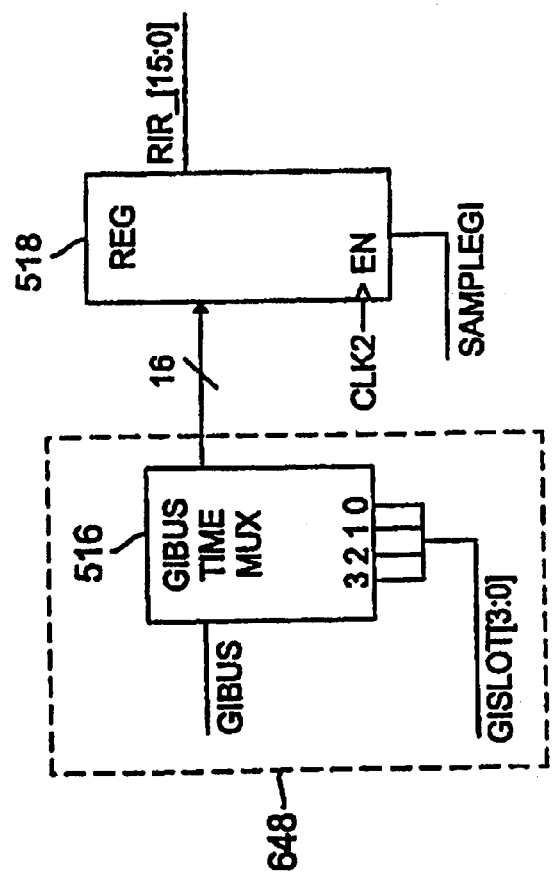

Similarly, referring to FIG. 9B, the GIBUS controller 648 includes a time multiplexor 516 for receiving the GIBUS serial bus and producing 16 output signals based on the value of signals GISLOT[3:0]. The RIR register 518 loads the signals on the rising edge of CLK2 if the signal SAMPLEGI is asserted. The register 518 provides output signals RIR[15:0].

Figure 10:
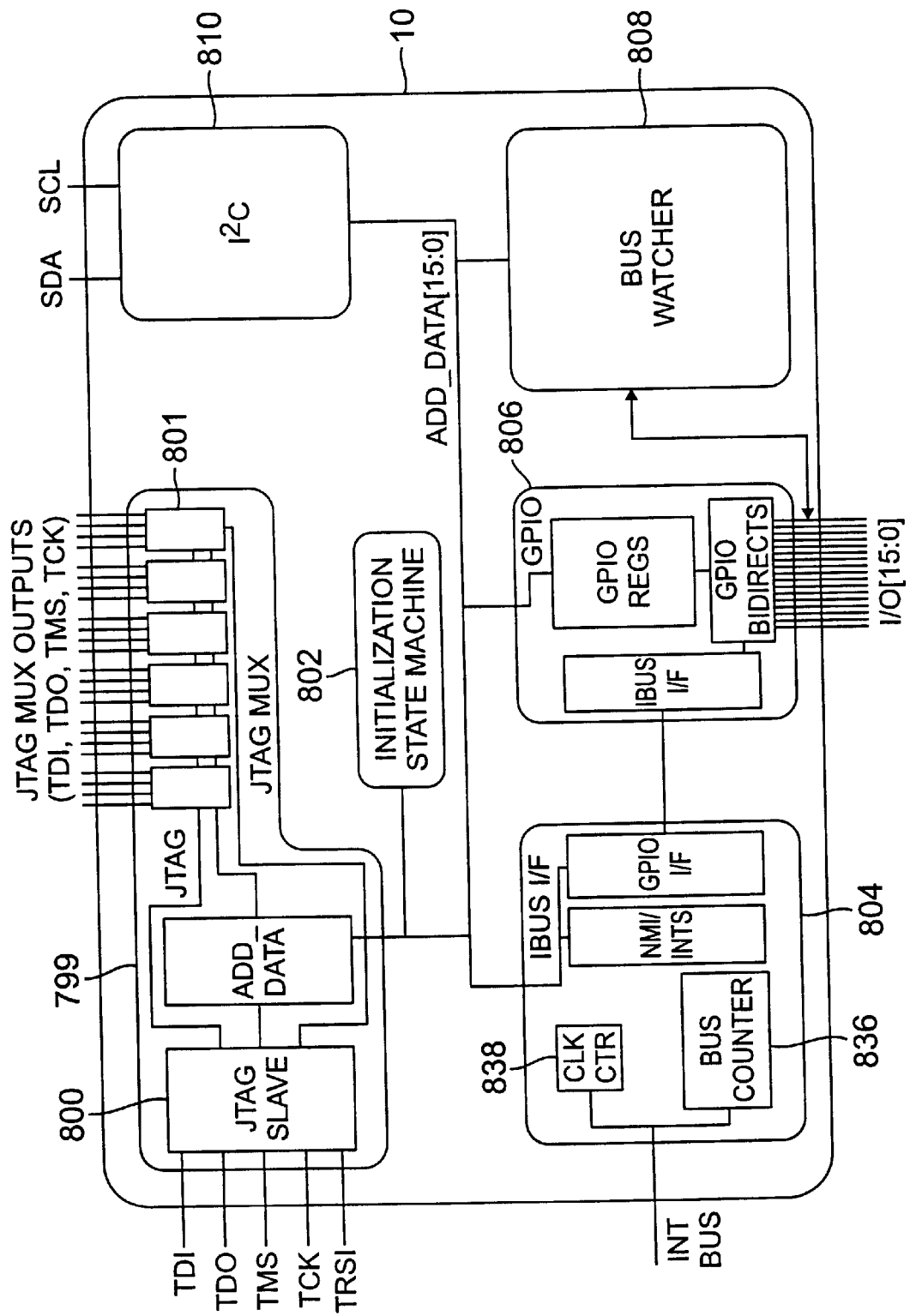
FIG. 10 is a block diagram of a system management remote (SMR) chip in the computer system.

Referring to FIG. 10, the SMR 10 includes a JTAG bus slave 800 (for handling JTAG communication with the JTAG master 600 in the SMC 11); a JTAG bus multiplexer 801 (for multiplexing JTAG signals to other JTAG and boundary scanable devices), an interrupt bus interface 804 (for communicating interrupts to the SMC 11 over the GIBUS or ICIB bus), an IIC bus master and slave 810 (for communicating over an IIC bus with other IIC devices, such as temperature sensors, power supply modules, fan sensors, over-voltage sensors, NVRAMs, and A/D converters), bus monitor logic 808 (for detecting faults on the connected bus), an initialization state machine 802 (for powering up and initializing the SMR 10), and a general purpose I/O (GPIO) block 806 (for receiving interrupt and error signals from the various sub-systems and relaying the information to the SMC 11 through the interrupt bus interface 804 and for asserting outputs). The SMR 10 fits in a 100-pin QFP, and it is designed to be compatible with both 5 volt and 3.3 volt operation.

Figure 10A:
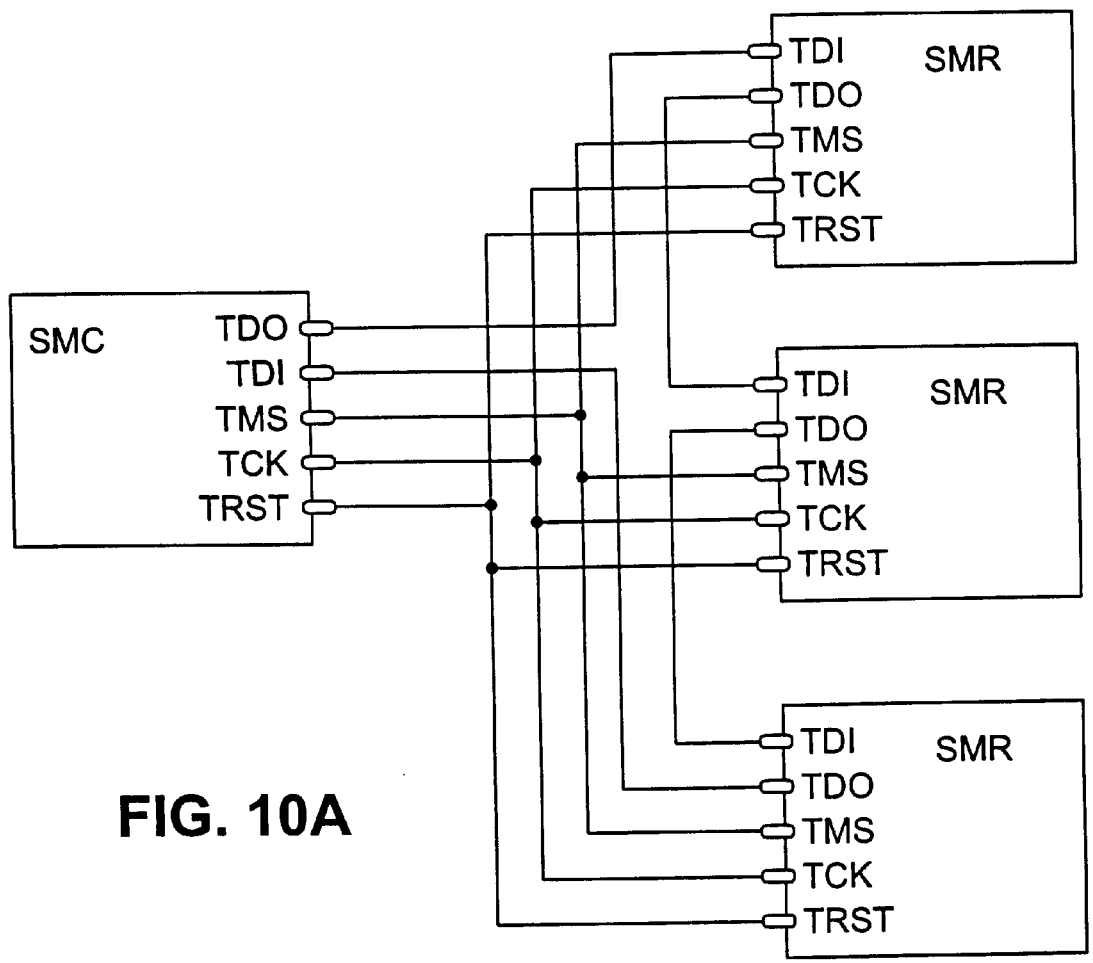
FIG. 10A is a block diagram of the JTAG connection between SMR chips and the SMC chip.

As shown in FIG. 10A, the JTAG master 600 in the SMC 11 is connected to the SMR JTAG slaves 800 over JTAG bus signals TDI (test data serial input), TDO (test data serial output), TCK (test clock for synchronizing communication over the TDI and TDO lines), TMS (test mode select for selecting the test mode), and TRST (test reset signal).

The JTAG multiplexer 801 allows each SMR 10 to select any of up to six other JTAG "chains" or "buses" which the SMR 10 is connected to. This allows the TDO output of one JTAG chain to be connected to the TDI input of the next JTAG chain to form a continuous chain if desired.

The bus watcher 808 tracks bus utilization and bus errors, and can be configured to one of three modes by strapping (programming) input pins I6 and I7 according to Table 1: EISA mode (SMR 10 connected to the EISA bus 44), host mode 1, or host mode 2.

TABLE 1

| I6 | I7 | SMR Mode |
|---|---|---|
| 0 | 0 | Host Mode 1 |
| 0 | 1 | Host Mode 2 |
| 1 | 0 | EISA Mode |

In EISA mode, the bus watcher 808 monitors the EISA bus 44 for an error condition, and also collects information to calculate EISA bus utilization. In host mode 1 or 2, the bus watcher 808 is programmed to perform other functions, including calculating bus utilization on a host bus (e.g., host bus 30).

The SMR bus watcher 808 provides signals (O0, O1, O2, O3, O4, and O5), which are stored in a register, for indicating which EISA bus device was involved when an EISA bus fault condition was detected. The SMR bus watcher 808 also drives slot-specific EISA reset signals RSTDRV[5:0] to each slot on the EISA bus 44. The O[5:0] and RSTDRV[5:0] signals are driven out on bi-directional SMR input/output pins I/O [15:0].

The bus watcher 808 receives EMAK[3:0]_ signals on input pins of the SMR 10. The signals EMAK[3:0]_ are generated by the ESC 162 (FIG. 2) and are encoded acknowledge signals that can be translated by a decoder in a receiving EISA device into slot-specific acknowledge signals for granting bus access to EISA bus masters. Table 2 shows the EISA slots selected by values of the signals EMAK[3:0]_.

TABLE 2

| EMAK[3:0] | EISA SLOT # |
|---|---|
| 0000 | 0 |
| 0001 | 1 |
| 0010 | 2 |
| 0011 | 3 |
| 0100 | 4 |
| 0101 | 5 |

The SMR 10F on the EISA bus 44 receives the EMAK [3:0] signals from the ESC 162 and generates signals MAK[7:0]_ based on the value of EMAK[3:0]. Thus, signal MAK[0]_ corresponds to slot 0 on the EISA bus 44, signal MAK[1]_ corresponds to slot 1 on the EISA bus 44, and so forth. The signals EMAK[3:0] are driven to the default binary value 1111 by the ESC 162 when the active bus master negates its request signal MREQ_. In response, the SMR 10F drives signals MAK[7:03]_ to the hexadecimal value FF, i.e., each of the signals MAK[7:0]_ is inactive high.

The ESC 162 includes logic for monitoring the EISA bus 44 for a bus timeout condition. If the bus time-out condition is detected, the ESC 162 asserts the EISA reset signal RESDRV (which is intercepted by the SMR 10F) to reset devices on the EISA bus 44 and generates a non-maskable interrupt (NMI) to the host CPU (one of CPU cards 28A–D).

The bus watcher 808 in the SMR 10F works in parallel with the error detection logic in the ESC 162 by also monitoring the EISA bus 44 for a bus timeout condition, as well as for a refresh holdoff condition. If either condition is detected, such condition is reported to the SMC 11 by the SMR 10F over the ICIB bus.

Figure 11:
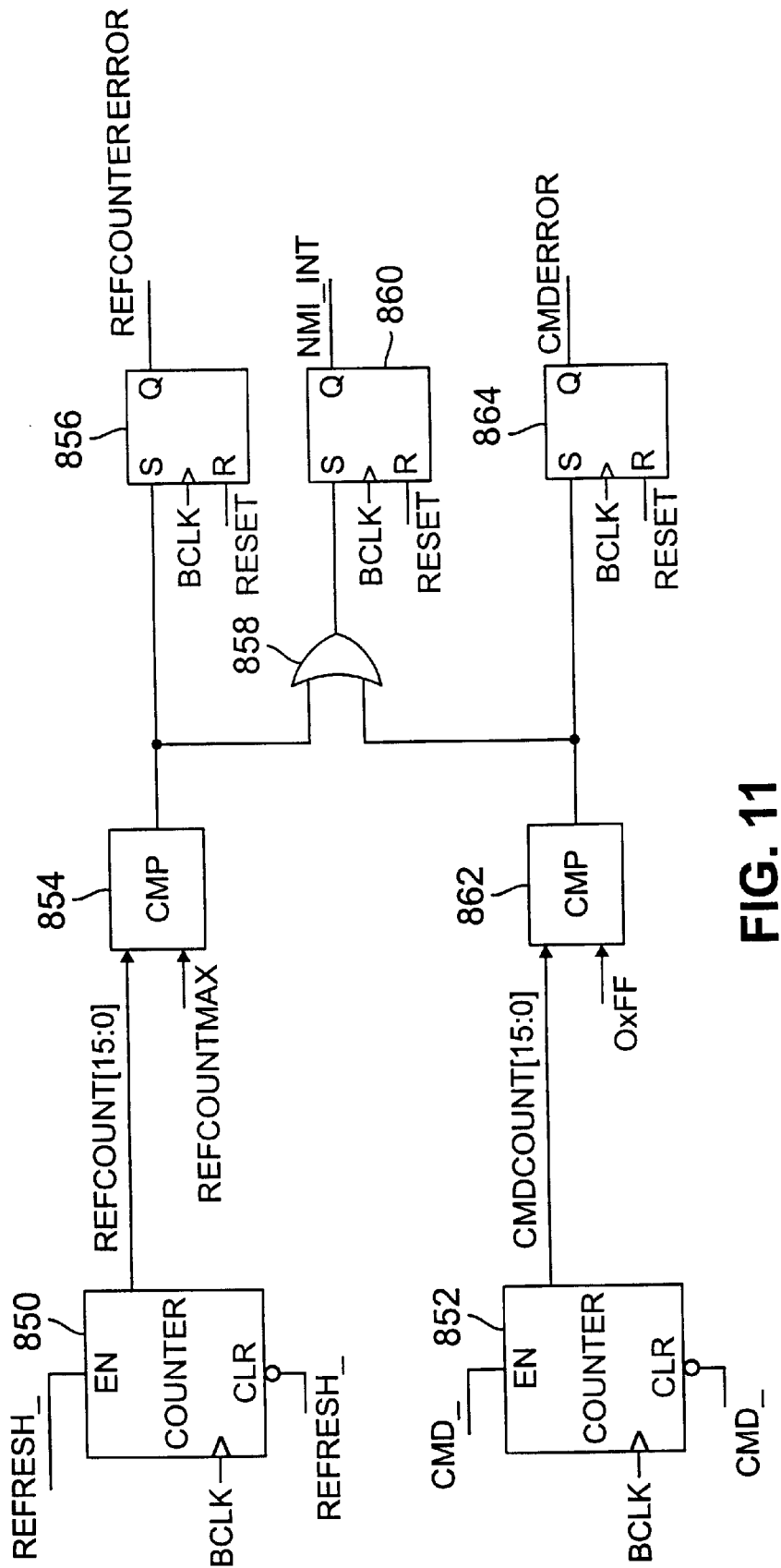
FIG. 11 is a logic diagram of circuitry for identifying bus error conditions.

Referring to FIG. 11, in the bus watcher 808, a counter 852 is used to detect for a bus timeout condition and a counter 850 detects a refresh holdoff condition. The counter 852 increments on each rising edge of the EISA bus clock BCLK when the signal CMD_ is asserted, and clears when the signal CMD_ is deasserted. If command count signals CMDCOUNT[15:0] from the counter 852 reach a predetermined count value (e.g., 256), a comparator 862 asserts its output high to set an S-R flip flop 864 high (a signal CMDERROR is set high). The flip flop 864 is clocked by the signal BCLK.

The counter 850 increments on the rising edge of each clock BCLK while the EISA bus refresh signal REFRESH_ is deasserted high, indicating a refresh cycle is not in progress. The counter 850 is cleared when the signal REFRESH_ is asserted. When refresh count signals REFCOUNT[15:0] reach a predetermined maximum refresh count value REFCOUNTMAX (e.g., 4, indicating that about 60 milliseconds have elapsed without a refresh cycle), a comparator 854 asserts its output high to set an S-R flip flop 856 high (a signal REFCOUNTERROR is set high). The flip flop 856 is clocked by BCLK.

If either comparator 854 or 862 asserts its output high, an OR gate 858 asserts its output high to set an S-R flip flop 860 (a signal NMI_INT is asserted high). The flip flop 860 is clocked by BCLK. All three of the flip flops 856, 860, and 864 are cleared when a reset signal RESET is asserted or a configuration bit in the SMR 10 is written.

Either bus error condition (refresh holdoff or bus timeout condition) will cause the interrupt bus interface 804 to place the state of the signal NMI_INT onto the ICIB bus to report the error condition to the SMC 11 by generating the interrupt in time slot 2 of the ICIB bus. In response, the SMC 11 asserts the interrupt signal SM_IRQ13 to the SMP 14. Under control of the SMM diagnostic software 224 generated in response to assertion of the interrupt signal SM_IRQ13, the SMC 11 reads a configuration register (which corresponds to the contents of a latch 820 in FIG. 12) over the JTAG bus to identify the faulty EISA slot device.

Figure 12:
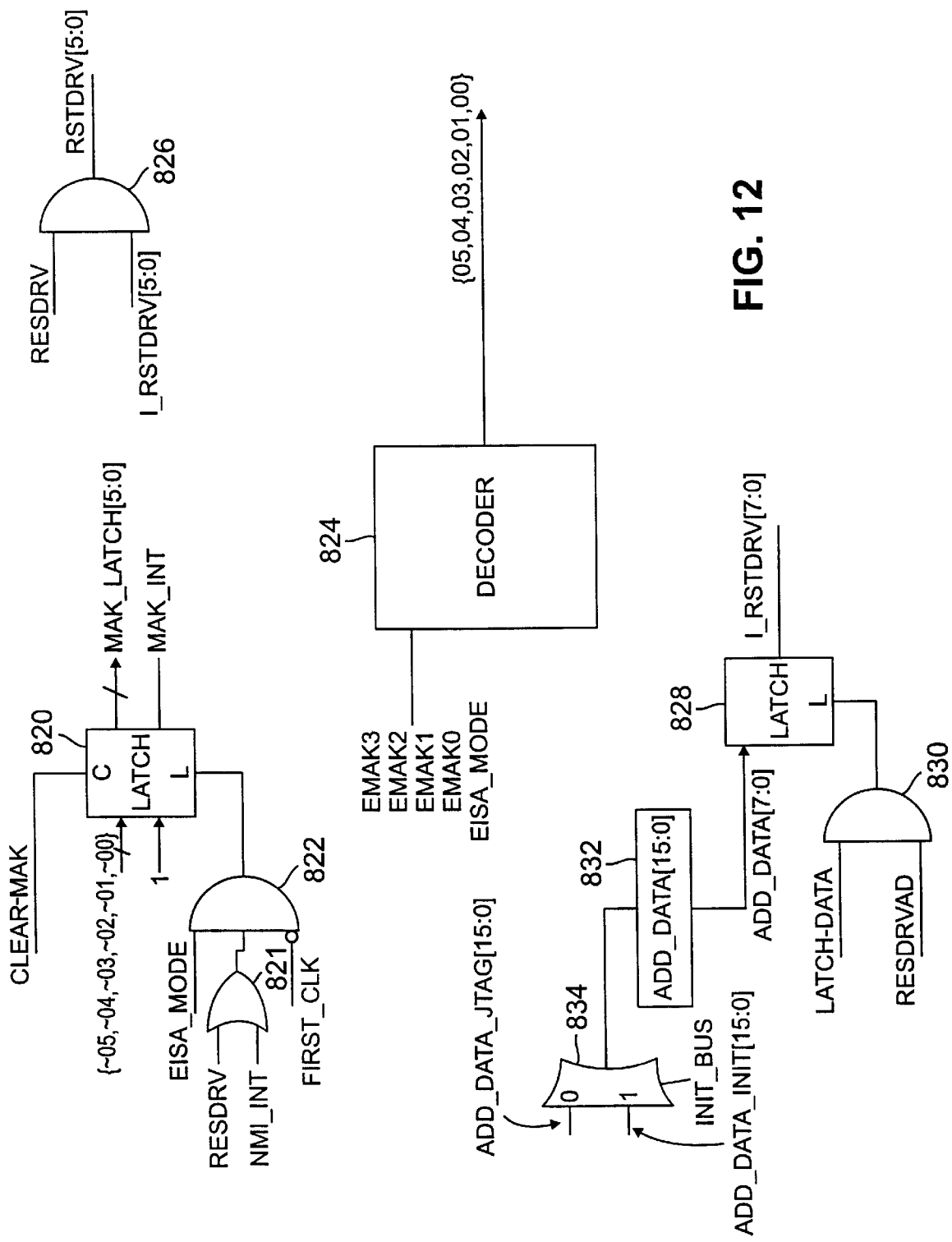
FIG. 12 is a logic diagram of circuitry for latching bus information and for resetting bus devices.

Referring to FIG. 12, the latch 820 in the SMR 10F latches the state of signals {~O5, ~O4, ~O3, ~O2, ~O1, ~O0} (which correspond to acknowledge signals for slots 5, 4, 3, 2, 1, and 0, respectively, on the EISA bus 44) upon the assertion of the signal RESDRV by the ESC 162 or upon assertion of the NMI_INT signal. The latch 820 produces signals MAK_LATCH[5:0], which correspond to signals ~O[5:0]. The latch 820 also sets a signal MAK_INT high to indicate that a bus error has occurred and an interrupt to the SMC 11 is needed. The latch input of the latch 820 is connected to the output of an AND gate 822, which receives a signal EISA_MODE (the SMR 10 is in EISA mode, i.e., connected to the EISA bus 44), the inverted state of a signal FIRST_CLK (to prevent latching of the MAK_ signals in the first BCLK period after the EISA reset signal RESDRV has been negated), and the output of an OR gate 821. The OR gate 821 receives the signal RESDRV and the signal NMI_INT.

The signals O[5:0] are generated by a decoder 824 according to Table 3 from signals EISA_MODE, EMAK3, EMAK2, EMAK1, and EMAK0.

TABLE 3

| EISA-MODE | EMAK3 | EMAK2 | EMAK1 | EMAK0 | {O5,O4,O3,O2,O1,O0} |
|---|---|---|---|---|---|
| 1 | 0 | 0 | 0 | 0 | 111110 |
| 1 | 0 | 0 | 0 | 1 | 111101 |
| 1 | 0 | 0 | 1 | 0 | 111011 |
| 1 | 0 | 0 | 1 | 1 | 110111 |
| 1 | 0 | 1 | 0 | 0 | 101111 |
| 1 | 0 | 1 | 0 | 1 | 011111 |

The bus watcher 808 includes six AND gates 826 for generating slot-specific reset signals RSTDRV[5:0] which are asserted to reset the EISA slots individually. One input of each of the AND gates 826 receive the EISA reset signal RESDRV while the other input receives signals I_RSTDRV [5:03] corresponding to signals RSTDRV[5:0], respectively. The SMM diagnostic software 224 can selectively reset a faulty bus device connected to a slot on the EISA bus 44 by controlling the value of signals I_RSTDRV[5:0].

The signals I_RSTDRV[5:0] are generated by a latch 828, whose data input is connected to the output of a register 832. The input to the register 832 is connected to the output of a 32:16 multiplexer 834, whose 0 input is connected to data signals ADD_DATA_JTAG[15:0] from the JTAG slave 800 and whose 1 input is connected to data signals ADD_DATA_INIT[15:0] from the initialization state machine 802. The select input of the multiplexer 834 receives a signal INITS_BUS for indicating if an initialization cycle is active. Once the SMM diagnostic software 224 has identified which EISA slot device is faulty, it programs the SMC 11 to write reset control bits over the JTAG data bus and through the SMR JTAG slave 800 to the bus watcher 808 for resetting the faulty device. The latch input of the latch 828 is connected to the output of an AND gate 830, whose inputs receive a signal LATCH_DATA (indicating that the JTAG slave 800 or initialization state machine 802 is presenting data to the latch 828) and a signal RESDRVAD (indicating that signals ADD_DATA JTAG [15:0] or ADD_DATA_INIT[15:0] contain an address corresponding to the latch 828).

Figure 17:
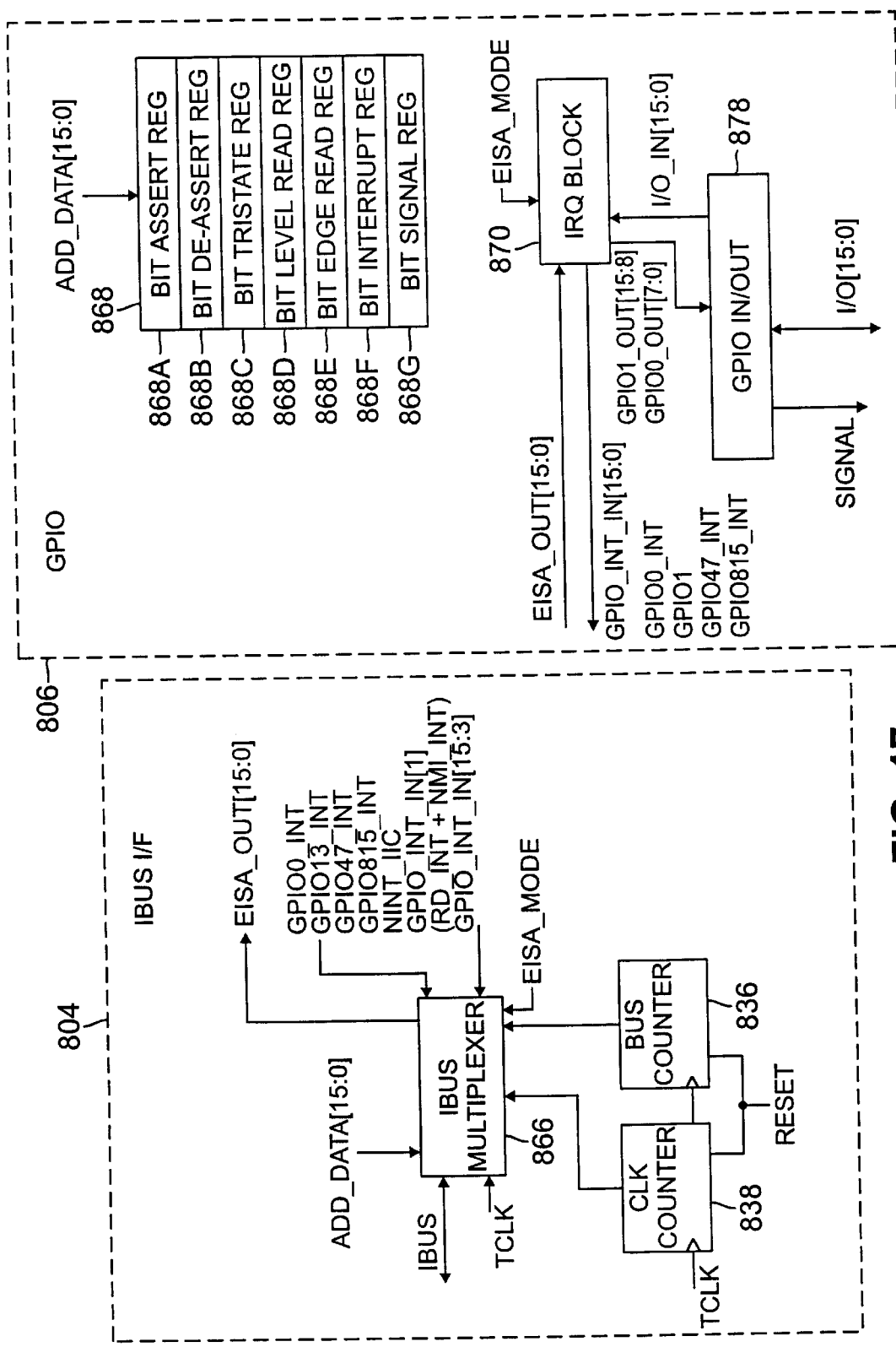
FIG. 17 is a block diagram of circuitry in the SMR chip.

Referring to FIG. 17, the interrupt bus interface 804 in each SMR 10 includes a bus counter 836 and a clock counter 838 for controlling the serial communication over the serial bus ICIB or GIBUS (hereinafter "IBUS"). An IBUS multiplexer 866 receives the output of the bus counter 836 (BUS_COUNTER[3:0])) and the output of the clock counter 838 (CLK_COUNTER[1:0]). The bus counter 836 counts which of the 16 time slots is currently active. The clock counter 838 counts which of the 4 clock periods in a time slot is active.

Figure 17A:
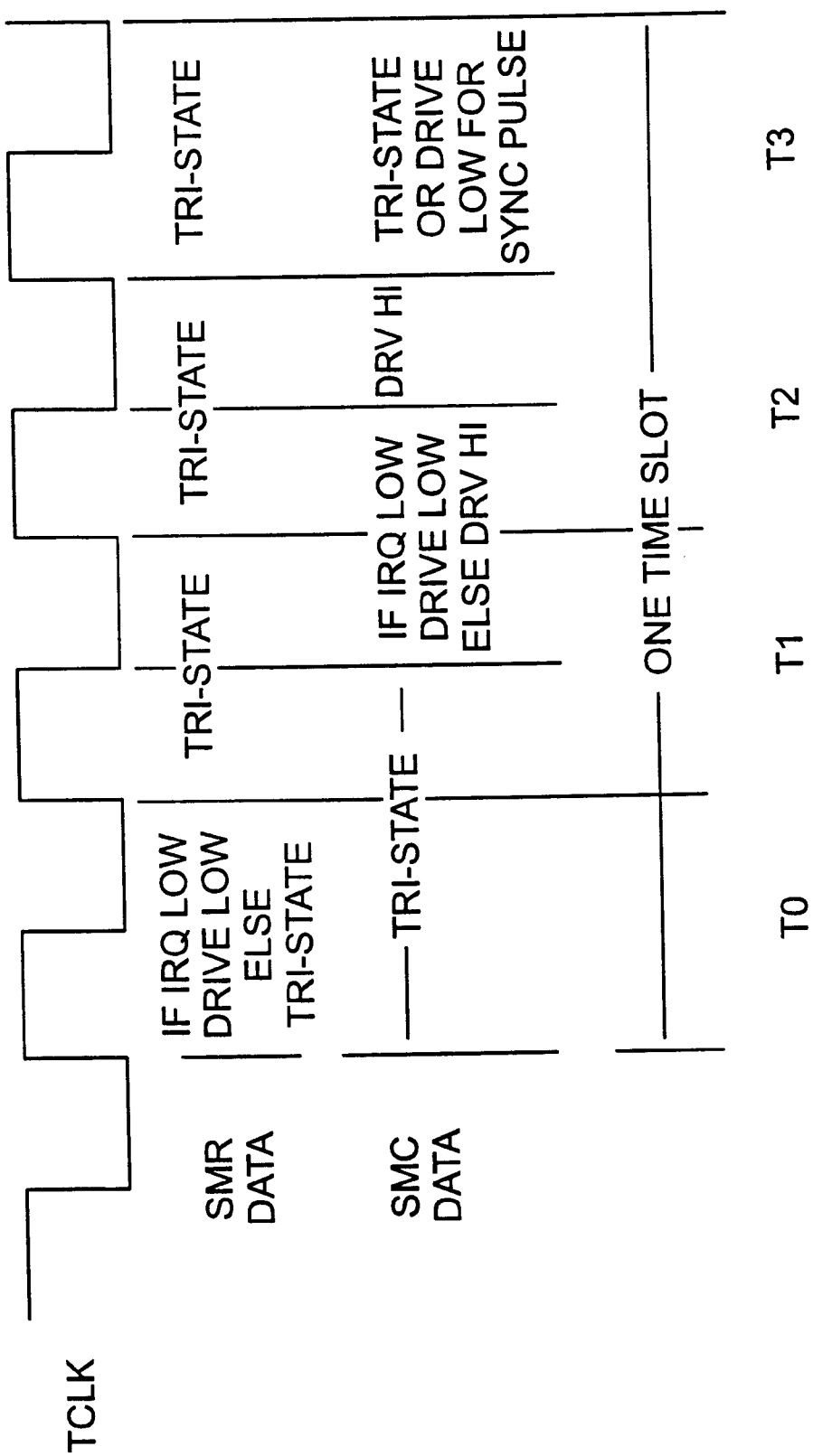
FIG. 17A is a timing diagram of a serial bus for routing interrupt signals.

Referring further to FIG. 17A, communication over the bus IBUS between an SMR 10 and the SMC 11 is synchronized to a clock TCLK generated by the SMC JTAG clock generator 640 (FIG. 6). The serial data bit in the bus IBUS is referred to as bit GID. Each time slot includes four TCLK clock periods.

When operating in EISA mode, the interrupt bus interface 804 is bi-directional. In the EISA SMR 10F, if the current time slot corresponds to an asserted interrupt from an EISA bus source, the interrupt bus interface 804 asserts the serial data bit GID low on the rising edge of TCLK in period T0. Otherwise, the interrupt bus interface 804 in the EISA SMR 10F maintains the serial data bit GID tri-stated. In the non-EISA SMRs, the bit in period T0 is asserted high if mapped to an active interrupt. The SMC 11 samples the state of the data bit GID on the rising edge of TCLK in period T1. In periods T1, T2 and T3, the SMR 10 maintains the serial data bit GID tri-stated.

If the SMC 11 needs to transmit an interrupt to an SMR 10 configured in EISA mode, it asserts the serial data bit GID low on the falling edge of TCLK in period T1. The SMR 10 configured in EISA mode samples the state of the serial data bit on the rising edge of TCLK in time period T2. On the falling edge of TCLK in time period T2, the SMC 11 drives the serial data bit GID high. By actively driving the bit GID high instead of relying on a pull-up resistor to pull the bit high, the clock TCLK can be run at a higher frequency, for example, 33 MHz.

The serial bus protocol allows more than one device to share an interrupt associated with a time slot. Thus, multiple devices can drive a time slot simultaneously to indicate that an interrupt is occurring.

In period T3, the SMC 11 either tri-states the serial data bit GID, or it can drive the data bit low to synchronize the SMR 10. Normally, the SMC 11 asserts the synchronization pulse at the end of time slot 15. If an SMR 10 detects the serial data bit GID asserted on the next rising edge of TCLK after time period T3, the bus counter 836 resets to zero.

On the falling edge of the reset signal RESET, each SMR 10 starts its interrupt bus counter 836 and clock counter 838. The interrupt bus counter 836 advances one count for each four rising edges of TCLK.

The IBUS multiplexer 866 receives signals from the GPIO block 806, including interrupt signals GPIO0_INT, GPIO13_INT, GPIO47_INT, GPIO815_INT, and GPIO_INT_IN[15:0]. Signals GPIO_ INT_IN[15:0] correspond to EISA interrupts if the SMR 10 is configured in EISA mode, and signals GPIO0_INT, GPIO13_INT, GPIO47_INT, and GPIO815_INT are used as interrupt signals in non-EISA mode. The IBUS multiplexer 866 also receives interrupt signals RD_ INT and NMI_INT from the bus watcher 808. The IBUS multiplexer 866 routes signals GPIO_INT_IN[15:0] onto the bus IBUS according to Table 5.

TABLE 5

(EISA MODE)

| TIME SLOT | INTERRUPT BUS (IBUS) |
|---|---|
| 0 | !NINT_IIC |
| 1 | !GPIO_INT_IN[1] |
| 2 | RD_INT + NMI_INT |
| 3 | !GPIO_INT_IN[3] |
| 4 | !GPIO_INT_IN[4] |
| 5 | !GPIO_INT_IN[5] |
| 6 | !GPIO_INT_IN[6] |
| 7 | !GPIO_INT_IN[7] |
| 8 | !GPIO_INT_IN[8] |
| 9 | !GPIO_INT_IN[9] |
| 10 | !GPIO_INT_IN[10] |
| 11 | !GPIO_INT_IN[11] |
| 12 | !GPIO_INT_IN[12] |
| 13 | !GPIO_INT_IN[13] |
| 14 | !GPIO_INT_IN[14] |
| 15 | !GPIO_INT_IN[15] |

In non-EISA mode, the IBUS multiplexer 866 routes signals GPIO0_INT, GPIO13_INT, GPIO47_INT, GPIO815_INT, NMI_SLOT and RD_INT onto the bus IBUS according to Table 6.

TABLE 6

(NON-EISA MODE)

| BUS-COUNT[3:0] | INTERRUPT BUS (IBUS) |
|---|---|
| RDSLOT | RD_INT |
| IICSLOT | !NINT_IIC |
| GPIO0SLOT | GPIO0_INT |
| GPIO13SLOT | GPIO13_INT |
| GPIO47SLOT | GPIO47_INT |
| GPIO815SLOT | GPIO815_INT |
| NMISLOT | NMI_INT |

Values RDSLOT, IICSLOT, GPIO0SLOT, GPIO13SLOT, GPIO47SLOT, GPIO815SLOT, and NMI_SLOT are programmed via the SMR internal bus ADD_DATA[15:03] under control of the SMC 11. Thus, flexibility is provided to route interrupts in different time slots on the serial bus IBUS in non-EISA mode.

If the SMR 10 is configured in EISA mode, the IBUS multiplexer 866 is capable of receiving interrupts from the SMC 11 over the serial bus IBUS, which are provided as signals EISA_OUT[15:0] to the GPIO block 806 for output as interrupt pins to the EISA bus 44.

The GPIO block 806 includes a set of GPIO configuration registers 868 which are programmable by the SMP 14 through the JTAG slave 800 and over the SMR internal bus ADD_DATA[15:0]). The GPIO configuration registers 868 are programmable to allow the SMR 10 to be used differently according to where in the computer system S the SMR 10 is placed.

One function of the GPIO block 806 is to receive and output EISA interrupts on its bi-directional input/output pins I/O[15:03] when the SMR 10 is configured in EISA mode. EISA interrupts are received by the GPIO I/O interface block 878 and routed to an IRQ block 870 over signals IOIN[15:0]. These signals are synchronized to the clock CLK of the SMR 10 (which is the EISA clock BCLK in EISA mode or a host bus clock or some other clock source) and driven out as signals GPIO_INT_IN[15:0] to the IBUS multiplexer 866. In the other direction, the IRQ block 870 receives interrupts EISA_OUT[15:0] from the IBUS multiplexer 866 and provides them as signals {GPIO1_OUT[7:0], GPIO0_OUT[7:0]} to the GPIO I/O interface block 878.

Figure 18:
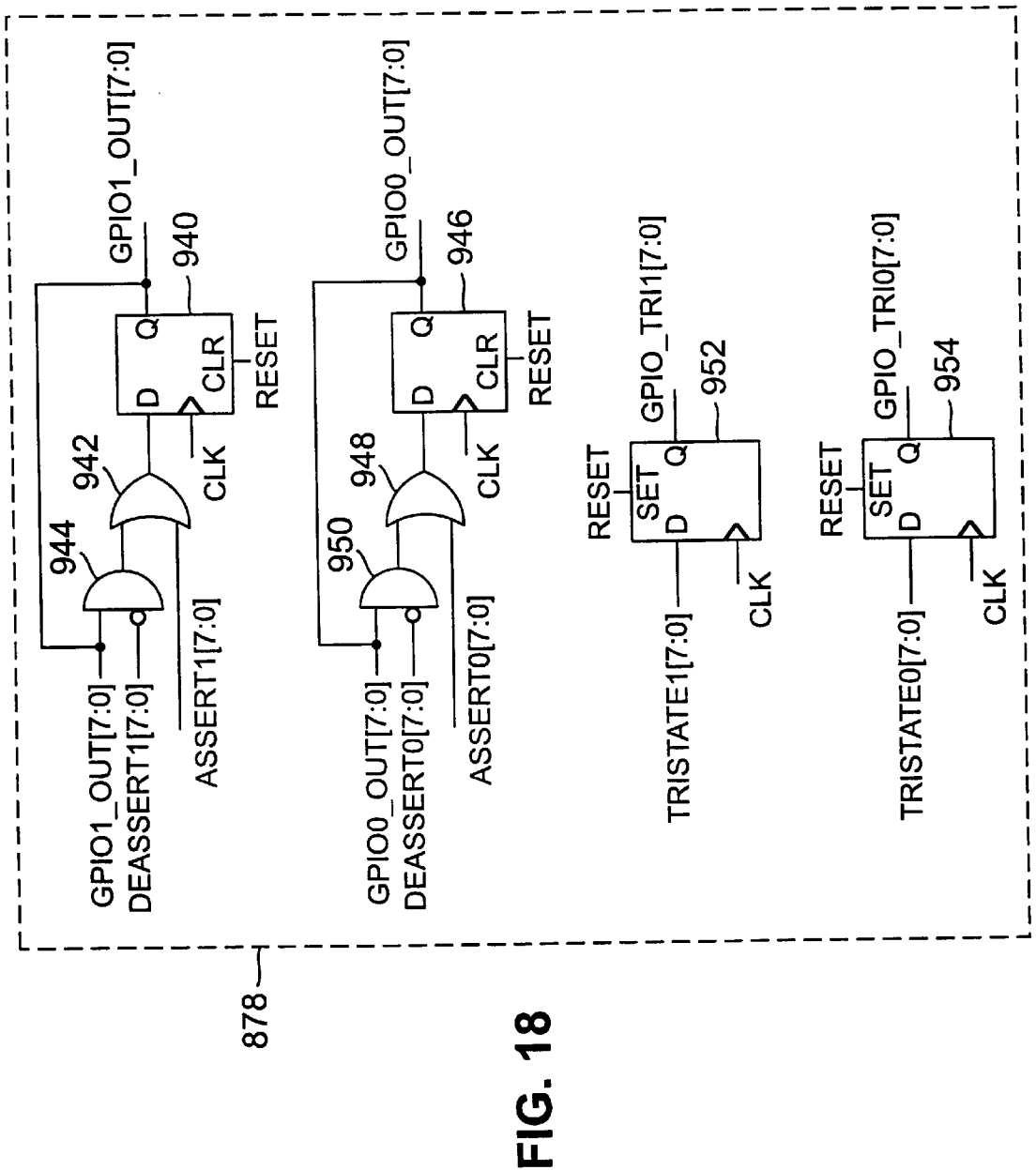
FIG. 18 is a logic diagram of circuitry associated with output pins in the SMR chip.

The signals GPIO1_OUT[7:0] and GPIO0_OUT[7:0] can also be controlled using the GPIO configuration registers 868. Referring further to FIG. 18, the GPIO I/O interface 878 includes D-type flip flops 940 and 946 for producing signals GPIO1_OUT[7:0] and GPIO0_OUT[7:0], respectively. Both flip flops 940 and 946 are clocked by CLK and cleared by RESET. The D inputs to the flip flops 940 and 946 are connected to the outputs of OR gates 942 and 948, respectively. The inputs of a set of 8 OR gates 942 are connected to the outputs of a set of 8 AND gates 944 and signals ASSERT1[7:0] (from configuration register 868A). The AND gates 944 perform a bit-wise AND operation of signals GPIO1_OUT[7:0] and the inverted states of signals DEASSERT1[7:0] (from configuration register 868B), and the OR gates 942 perform a bit-wise OR operation of the outputs of AND gates 944 and signals ASSERT1[7:0] (from configuration register 868B). The inputs of a set of 8 OR gates 948 receive the outputs of a set of 8 AND gates 950 and signals ASSERT0[7:0]. The AND gates 950 perform a bit-wise AND operation of signals GPIO0_OUT[7:0]) and the inverted states of signals DEASSERT0[7:0] (from configuration register 868B), and the OR gates 948 perform a bit-wise OR operation of the outputs of the AND gates 950 and signals ASSERT0[7:0]. The ASSERT1[7:0] and ASSERT0[7:0] signals if asserted high sets signals GPIO1_OUT[7:0] and GPIO0_OUT[7:0]) to active states. The DEASSERT1[7:0] and DEASSERT0[7:0] signals when asserted clear the GPIO1_OUT[7:0] and GPIO0_OUT[7:0] signals.

An example use of this is to tie a reset to a card (such as a CPU card, for example) to a GPIO pin. The GPIO block 806 can then be used to hold the card in reset if faulty.

The output buffers in the GPIO block 806 driving pins I/O[15:0] are tristated by driving signals GPIO_TRI1[7:0] (controlling pins I/O[15:8]) and GPIO_TRI0[7:0] (controlling pins I/O[7:0]) to active high states. The signals GPIO_TRI1[7:0] and GPIO_TRI0[7:0] are provided by 8-bit registers 952 and 954, respectively. The inputs of the registers 952 and 954 receive signals TRISTATE1[7:0] and TRISTATE0[7:0], respectively, from the GPIO configuration register 868C. The registers 952 and 954 are clocked by CLK and initialized high by RESET.

The GPIO configuration registers 868 include a set of 7 registers 868A–868G. The values of the configuration registers 868 are programmable via the SMR internal bus ADD_DATA[15:0], thus allowing the SMC 11 to control the configuration of the GPIO block 806 over the JTAG bus.

The 16-bit assert register 868A provides output bits ASSERT1[7:0] and ASSERT0[7:0]) each for asserting a corresponding GPIO output pin. The 16-bit deassert register 868B provides output bits DEASSERT1[7:0] and DEASSERT0[7:0] each for deasserting a corresponding GPIO output pin. The 16-bit tristate register 868C provides output bits TRISTATE1[7:0] and TRISTATE0[7:0] to tristate the output buffers driving pins I/O[15:0]. The values of the configuration registers 868A–868C can be read on the SMR internal bus to allow software to poll the states of the configuration bits.

Configuration registers 868D and 868E are read only registers on the SMR internal bus. The 16-bit level read register 868D contains the states of the GPIO pins I/O[15:0], as represented by the signals IO_IN[15:0]. Software can read the state of the level read register 868D to determine the state of the GPIO pins I/O[15:0]. The 16-bit edge read register 868E contains a value (represented as EDGEREAD [15:0]) indicating which of the 16 pins I/O[15:0]) have changed states. An active bit in the edge read register 868E indicates that the corresponding GPIO pin has changed state since the last register read. Reading that register bit from the SMR internal bus causes the register bit to be cleared.

Configuration registers 868F–868G are readable and writable from the SMR internal bus ADD_DATA[15:0]. The 16-bit interrupt register 868F, represented as INTENBL1[7:0] and INTENBL0[7:0], indicates which of the 16 GPIO pins I/O[15:0]) is tied to an interrupt source. If, for example, bit INTENBL1[1] is set high, then GPIO pin I/O[9] is defined as an interrupt pin; if bit INTENBL0[7] is set high, then GPIO pin I/O[7] is defined as an interrupt.

Figure 19:
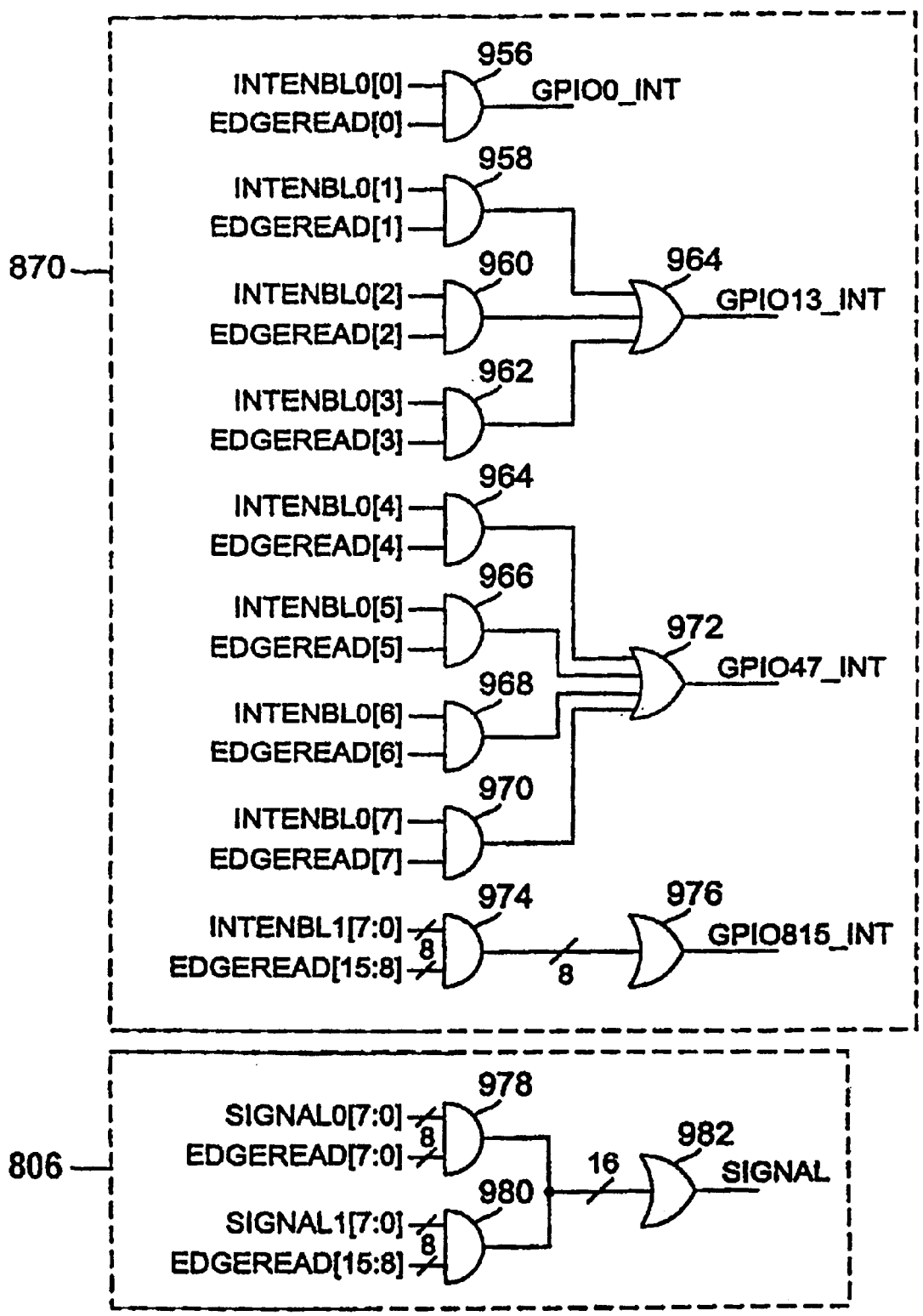
FIG. 19 is a logic diagram of circuitry for generating interrupt signals in the SMR chip.

Referring further to FIG. 19, the interrupt signals GPIO0_INT, GPIO13_INT, GPIO47_INT, and GPIO815_INT (used in non-EISA mode) are generated from signals INTENBL0[7:0], INTENBL1[7:0], and EDGEREAD[15:0]. The interrupt signal GPIO0_INT is generated by an AND gate 956 from signals INTENBL0[0] and EDGEREAD[0]). Thus, if pin I/O[0] is enabled as an interrupt bit and the pin I/O0[0] changes state, then the interrupt signal GPIO0_INT is asserted high, which in turn is forwarded to the SMC 11 over the bus IBUS.

The interrupt signal GPIO13_INT is generated by an OR gate 964, which receives the outputs of AND gates 958, 960, and 962. The 2-input AND gates 958, 960, and 962 receive signal combinations INTENBL0[1] and EDGEREAD[1], INTENBL0[2] and EDGEREAD[2], and INTENBL0[3] and EDGEREAD[3], respectively.

Similarly, the interrupt signal GPIO47_INT is generated from signals INTENBL0[7:4] and EDGEREAD[7:4] using an OR gate 972 and AND gates 964, 966, 968, and 970. The interrupt signal GPIO815_INT is generated from signals INTENBL1[7:0] and EDGEREAD[15:8] using an OR gate 976 and a set of 8 AND gates 974, which perform bitwise AND operations of signals INTENBL1[7:0] and EDGEREAD[15:8]. The OR gate 976 asserts the signal GPIO815_INT high if any of the eight outputs of the AND gates 974 is high.

The 16-bit signal register 868G, represented as SIGNAL1[7:0] and SIGNAL0[7:0], controls the state of an output pin SIGNAL from the GPIO block 806. The signal SIGNAL is provided by an OR gate 982, which receives the 16 outputs of AND gates 978 and 980. The AND gates 978 perform a bit-wise AND operation of signals SIGNAL0[7:0] and EDGEREAD[7:0], and the AND gates 980 perform a bit-wise AND operation of signals SIGNAL1[7:0]) and EDGEREAD[15:8].

Figure 13:
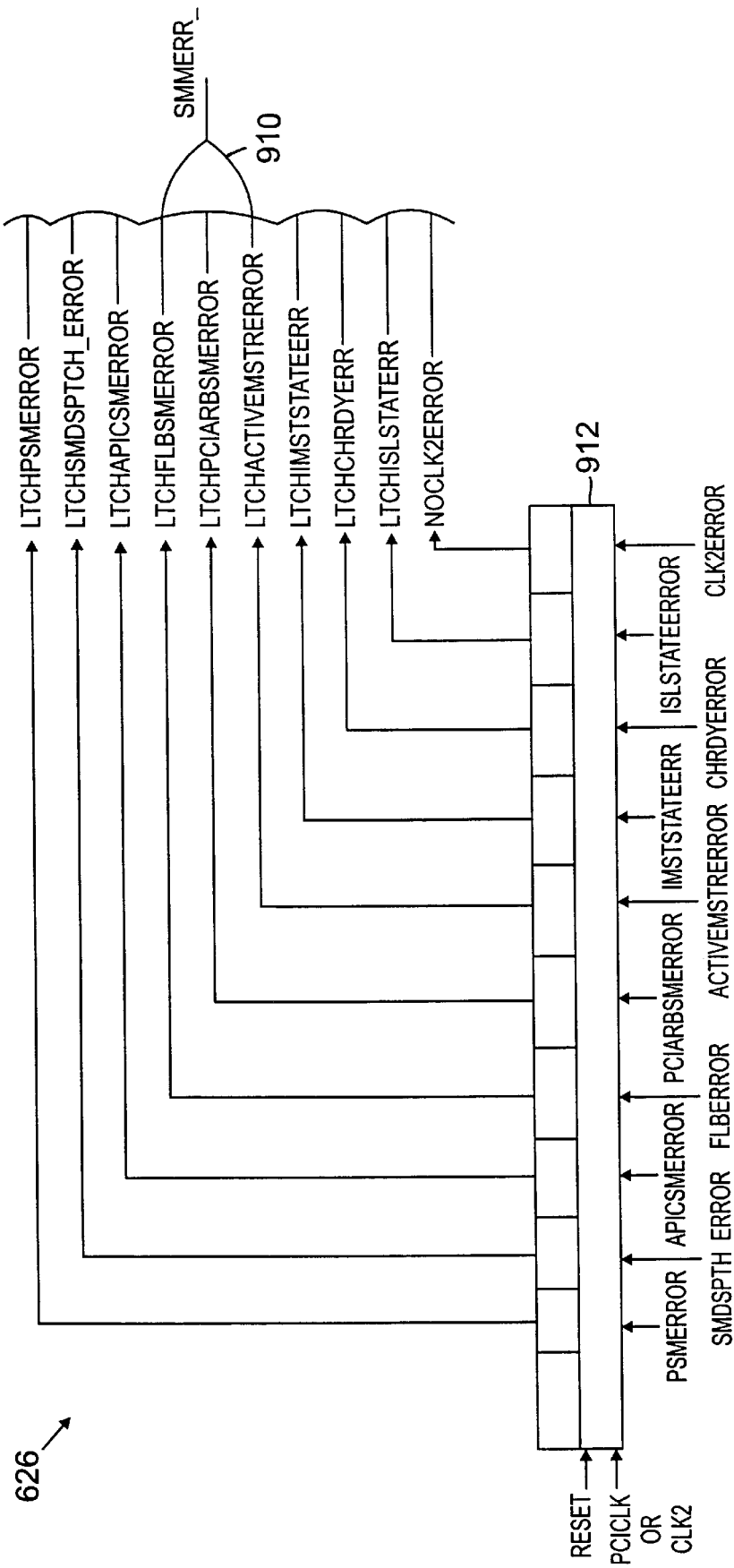
FIG. 13 is a logic diagram of circuitry for storing information relating to faulty modules in the SMC chip.

In the SMC registers block 626 (FIG. 6) of the SMC 11, detection logic monitors for error conditions in the different modules of the SMC 11 as well as for an error on the local ISA bus 18. Referring to FIG. 13, errors inside the SMC 11 are reported as a signal SMMERR_, which causes assertion of the signal ERR2SM_IRQ13 (FIG. 9) for generation of the interrupt SM_IRQ13 to the SMP 14. The signal SMMERR_ is also stored in a status register in the SMC registers block 626.

The signal SMMERR_ is generated by an OR gate 910, which receives error signals from different modules in the SMC 11. The error signals are provided by a set of registers 912 inside the SMC configuration registers block 626. The signals from the output of the registers 912 include LTCHPSMERROR, LTCHSMDSPTCH_ERROR, LTCHAPICSMERROR, LTCHFLBSMERROR, LTCHPCIARBSMERROR, LTCHACTIVEMSTRERROR, LTCHIMSTSTATEERROR, LTCHCHRDYERR, LTCHISLSTATEERR, and NOCLK2ERROR, which are set high in response to assertion of signals PSMERROR, SMDSPTCH_ERROR, APICSMERROR, FLBERROR, PCIARBSMERROR, ACTIVEMSTRERROR, IMSTSTATEERR, CHRDYERROR, ISLSTATEERROR, and CLK2ERROR, respectively, on the rising edge of either clock signal PCICLK or CLK2. All the signals are clocked on PCICLK except APICSMERROR, which is clocked on CLK2. Once set high, the signals are maintained high by the registers 912 until reset (RESET is asserted high). The signal RESET is different from the PCI reset, that is, a PCI reset will not necessarily cause the signals to be cleared.

The signals in the registers 912 when asserted high represent the following error conditions: the signal LTCHPSMERROR indicates that a state machine in the processor controller (PCON) 683 has transitioned to an illegal state; the signal LTCHSMDSPTCH_ERROR indicates that a state machine in the SMC arbiter 622 has transitioned to an illegal state, or a cycle for the local ISA bus 18 is pending but the address associated with the request is not within the memory or I/O space allocated to the SMM 9; the signal LTCHAPICSMERROR indicates that a state machine in the APIC I/O slave 606 has transitioned to an illegal state; the signal LTCHFLBSMERROR indicates that a state machine in the SMC local bus controller 632 has transitioned to an illegal state; the signal LTCHPCIARBSMERROR indicates that the state machines in the PCI arbiter 608 has gone to an illegal state; the signal LTCHACTIVEMSTRERROR indicates that an illegal master has been selected as the "parking" master on the PCI bus 20; the signal LTCHIMSTSTATEERR indicates that a state machine in the PCI master block 612 has gone to an illegal state; the signal LTCHISLSTATERR indicates that a state machine in the PCI slave block 614 has gone to an illegal state; the signal LTCHCHRDYERR indicates that the signal CHRDY (which allows an ISA bus device on the ISA bus 18 to request additional wait states to complete a particular transaction) has been asserted by that device for more than 2.56 $\mu s$ and thus an ISA bus violation has occurred; and the signal NOCLK2ERROR indicates that the internal clock CLK2 in the SMC 11 is not toggling.

Figure 14:
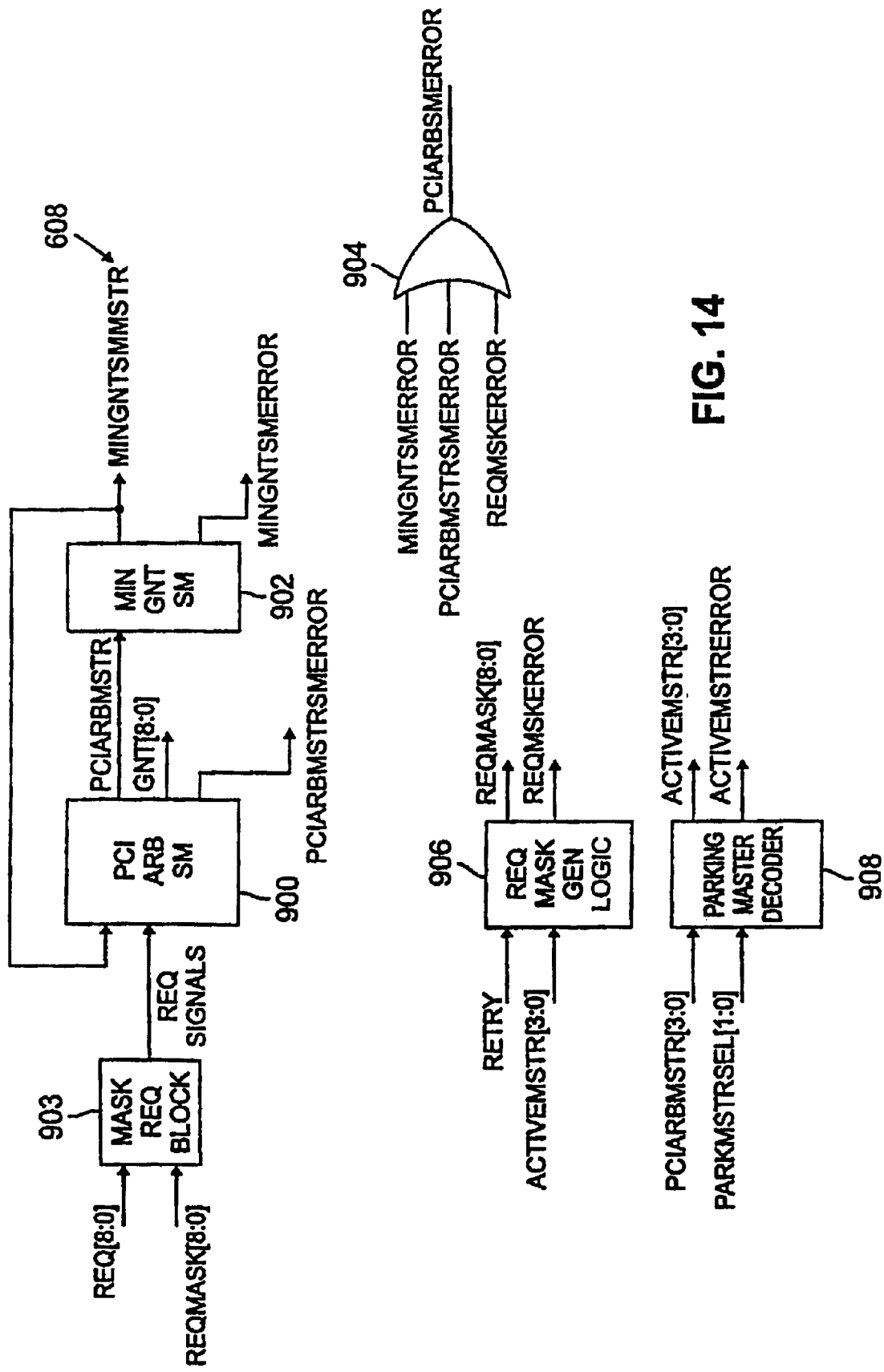
FIG. 14 is a logic diagram of circuitry for detecting errors in an arbiter in the SMC chip.

Referring to FIG. 14, the PCI arbiter 608 (FIG. 6) includes a PCI arbitration state machine 900 and a minimum grant state machine 902. The PCI arbitration state machine 900 generates signals PCIARBMSTR[3:0] (for indicating the state of the arbitration state machine 900) and grant signals GNT[8:0] provided to PCI masters. The PCI arbitration state machine 900 receives request signals from a mask request block 903, which receive request signals REQ[8:0] from the nine possible PCI masters and mask signals REQMASK[8:0]. If any of the mask signals are REQMASK[8:0] is asserted high, then the corresponding request signal is masked and the PCI arbitration state machine 900 does not detect assertion of the corresponding request signal. The PCI arbitration state machine 900 is able to transition to 16 possible states; however, only 11 of those states are defined and the remaining 5 states are illegal states. If the PCI arbitration state machine 900 somehow transitions to one of those 5 illegal states, then the PCI arbitration state machine 900 asserts a signal PCIARBMSTRSMERROR to indicate such an illegal state condition has occurred. Similarly, the minimum grant state machine 902 also has certain illegal states. Transition to those illegal states causes the minimum grant state machine 902 to assert a signal MINGNTSMERROR.

A request mask generation logic block 906 generates signals REQMASK[8:0] in response to assertion of a signal RETRY, indicating that the current active master on the PCI bus 20 is being retried by the PCI target. Thus, if the signal RETRY is asserted high, indicating a retry condition, a signal REQMASK[X] is asserted based on the value of signals ACTIVEMASTR[3:0], which represent the current active PCI master on the PCI bus 20. If the value of the signals ACTIVEMSTR[3:0] do not contain a value corresponding to one of the valid PCI bus masters when the signal RETRY is asserted, then a signal REQMSKERROR is asserted high by the request mask generation logic block 906 to indicate that a retry has been asserted and a valid active master is not currently owning the PCI bus 20. The signals MINGNTSMERROR, PCIARBMSTRSMERROR, and REQMSKERROR are provided to inputs of an OR gate 904, whose output produces the signal PCIARBSMERROR to indicate that an error condition has occurred in the PCI arbiter 608.

The signals ISLSTATEERROR, IMSTSTATEERR, FLBERROR, APICSMERROR, SMDSPTCH_ERROR, and PSMERROR are generated in similar fashion as signals PCIARBMSTRSMERROR and MINGNTSMERROR, that is, in response to detection of illegal states.

The PCI arbiter 608 also includes a park-master decoder 908 for determining which PCI device on a PCI bus 20 should be the owner of the bus when the PCI bus 20 is idle. Such a PCI device is referred to as the "parking master." The parking master is selectable by signals PARKMSTRSEL [1:0], which are stored in the SMC configuration registers 626 and programmable by software. If the signals PCIARBMSTR[3:0] indicate that the PCI arbitration state machine 900 is in the idle state, then the signals ACTIVEMSTR[3:0] are set to a value to indicate which of the PCI masters is the current parking master, as determined from Table 4.

TABLE 4

| PARKMSTRSEL[1] | PARKMSTRSEL[O] | MASTER |
|---|---|---|
| 0 | 0 | LAST PCI MASTER |
| 0 | 1 | SMC |
| 1 | 1 | CPU |
| 1 | 1 | ILLEGAL |

If the signals PARKMSTRSEL[1:0] contain the binary value 00, then the parking master is the last PCI master which owned the PCI bus 20. If the signals contain the binary value 01, then the SMC 11 is the parking master. If the signals contain the binary value 10, then the CPU-PCI bridge 22 is the parking master. If the signals PARKMSTRSEL[1:0] contain the binary value 11, then an illegal condition exists, and the park master decoder 908 asserts the signal ACTIVEMSTRERROR.

Figure 15:
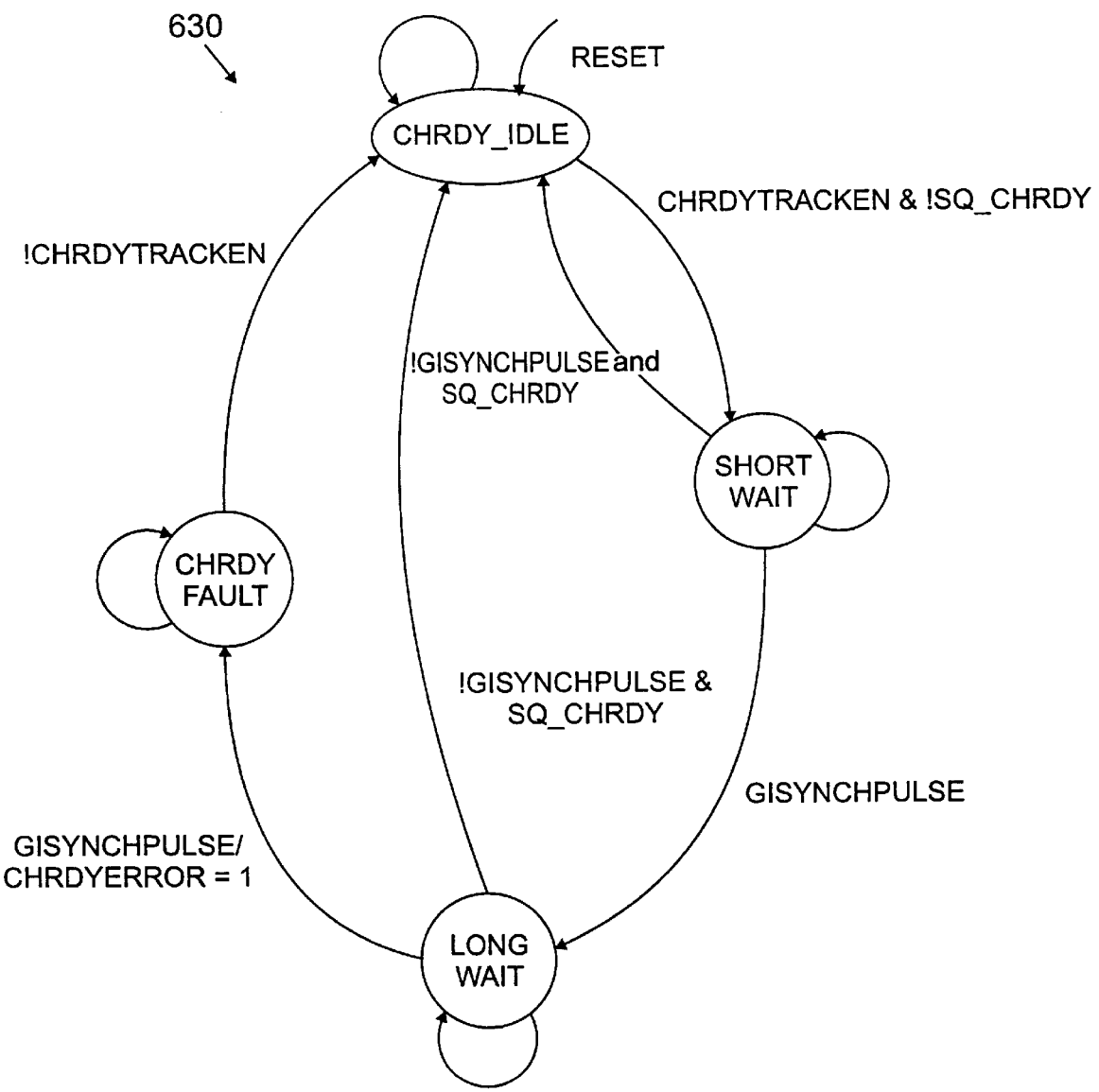
FIG. 15 is a state diagram for detecting error on a local ISA bus in the SMM.

Referring to FIG. 15, a state machine 633 in the local bus controller 630 (FIG. 6) monitors the state of the signal CHRDY. An ISA bus device can assert the signal CHRDY low to request additional time to complete the current cycle. The state machine tracks the length of time during which the signal CHRDY is asserted low. The state machine 633 starts in state CHRDY_IDLE on assertion of the RESET signal. If CHRDY tracking is enabled (CHRDYTRACKEN is high) and CHRDY is asserted low by a bus device (SQ_CHRDY is driven low), the state machine 633 transitions to state SHORT_WAIT. The GIBUS controller 648 (FIG. 7) in the SMC 11 generates a synchronization pulse GISYNCH-PULSE in time slot 15 of the bus GIBUS. If the state machine detects assertion of the signal GISYNCHPULSE, it transitions to state LONG_WAIT. If the signal SQ_CHRDY is driven high before assertion of the signal GISYNCHPULSE, the state machine transitions from state SHORT_WAIT back to state CHRDY_IDLE.

In state LONG_WAIT, if the signal GISYNCHPULSE has been asserted high, indicating that another 15 time slots have elapsed on the bus GIBUS, the state machine transitions to state CHRDY_FAULT. Assertion of the signal GISYNCHPULSE twice is equivalent to 2.56 μs elapsing. Thus, if an ISA bus device is keeping the signal CHRDY asserted for more than the elapsed time of 2 complete GIBUS cycles, an error condition has occurred and the state machine 633 asserts the signal CHRDYERROR high. If, before assertion of the signal GISYNCHPULSE, the ISA bus device drives the signal CHRDY high (causing the signal SQ_CHRDY to go high), the state machine 633 transitions from state LONG_WAIT back to state CHRDY_IDLE. (Alternatively, instead of using the signal GISYNCHPULSE to determine the amount of time that has elapsed, a separate counter can be used to count the total elapsed time.) The state machine 633 remains in state CHRDY_FAULT until software clears the signal CHRDYTRACKEN in the SMC configuration registers 626. When the signal CHRDYTRACKEN is driven low, the state machine transitions from state CHRDY_FAULT to state CHRDY_IDLE.

Figure 16:
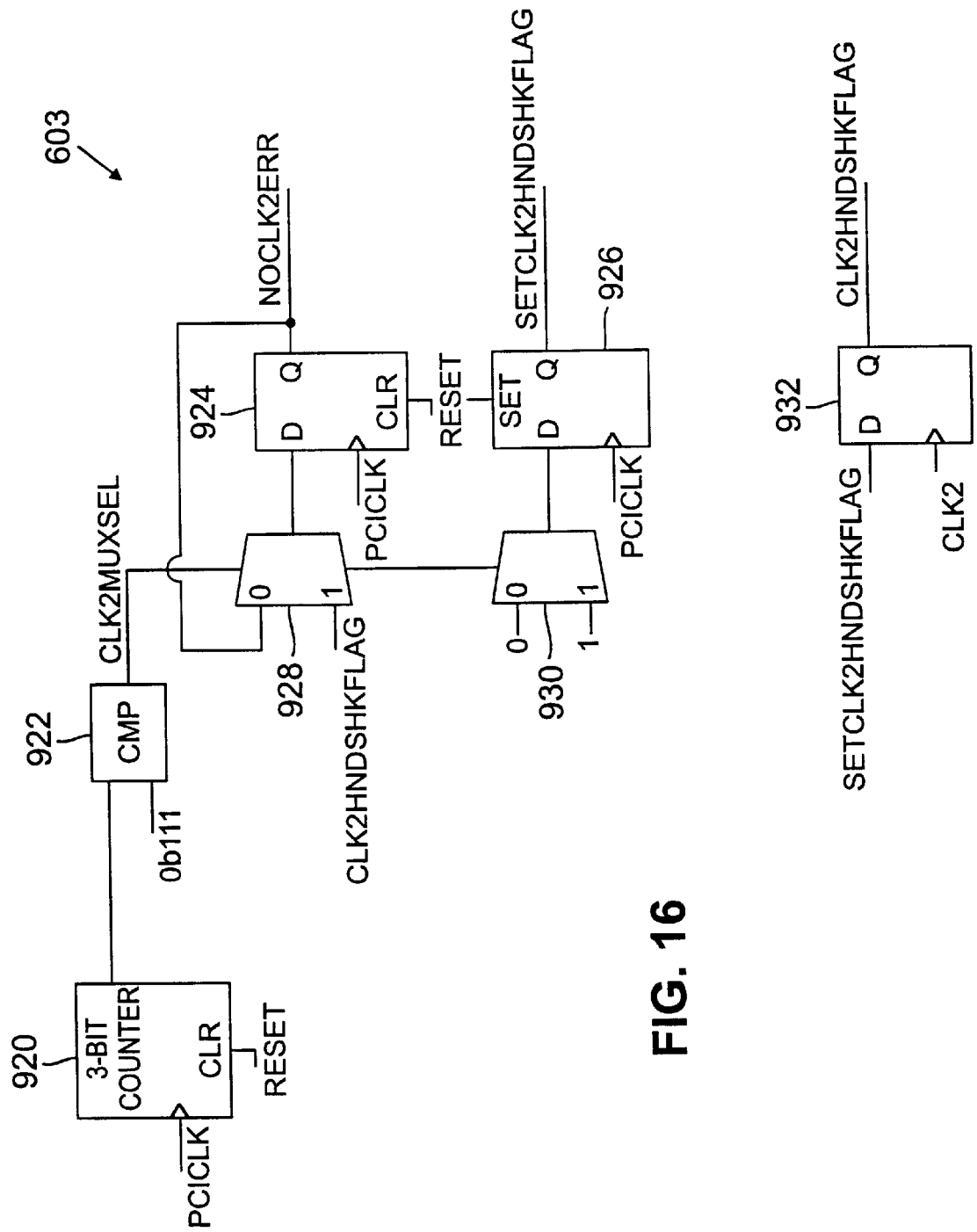
FIG. 16 is a logic diagram for detecting for a clock error condition in the SMC chip.

Referring to FIG. 16, the reset generator 603 (FIG. 6) includes logic to determine if the signal CLK2 is toggling. A 3-bit counter 920 is clocked on the rising edge of each PCICLK clock, and it is cleared on the assertion of the signal RESET. When the 3-bit counter 920 reaches the binary value 111, a comparator 922 asserts its output CLK2MUXSEL high. The signal CLK2MUXSEL is provided to the select inputs of 2:1 multiplexers 928 and 930. The output of the multiplexer 928 is provided to the D input of a D-type flip-flop 924, which is clocked on the signal PCICLK and cleared by the signal RESET. The output of the flip-flop 924 provides a signal NOCLK2ERR, which is routed back to the 0 input of the multiplexer 928. The 1 input of the multiplexer receives a signal CLK2HNDSHKFLAG, which when asserted high indicates that the signal CLK2 has stopped toggling.

The output of the multiplexer 930 is provided to the D input of a flip-flop 926, which is clocked by the signal PCICLK and set high by the signal RESET. The output of the flip-flop 926 provides a signal SETCLK2HNDSHKFLAG provided to the D input of a D-type flip-flop 932. The 0 input of the multiplexer 930 is tied low and its 1 input is tied high. Thus, whenever the signal CLK2MUXSEL is asserted high (indicating that 8 PCICLK clock periods have elapsed), the signal SETCLK2HNDSHKFLAG is set high. The signal SETCKL2HNDSHKFLAG drives the state of the signal CLK2HNDSHKFLAG through the flip-flop 932 on the rising edge of the clock CLK2. Thus, if the signal CLK2 has stopped toggling, then the state of the signal CLK2HNDSHKFLAG maintains its current value. If the signal CLK2 has stopped functioning, then signal CLK2HNDSHKFLAG would be "stuck" high, which would cause the signal NOCLK2ERR to be driven high to indicate that CLK2 has stopped toggling.

Figure 20:
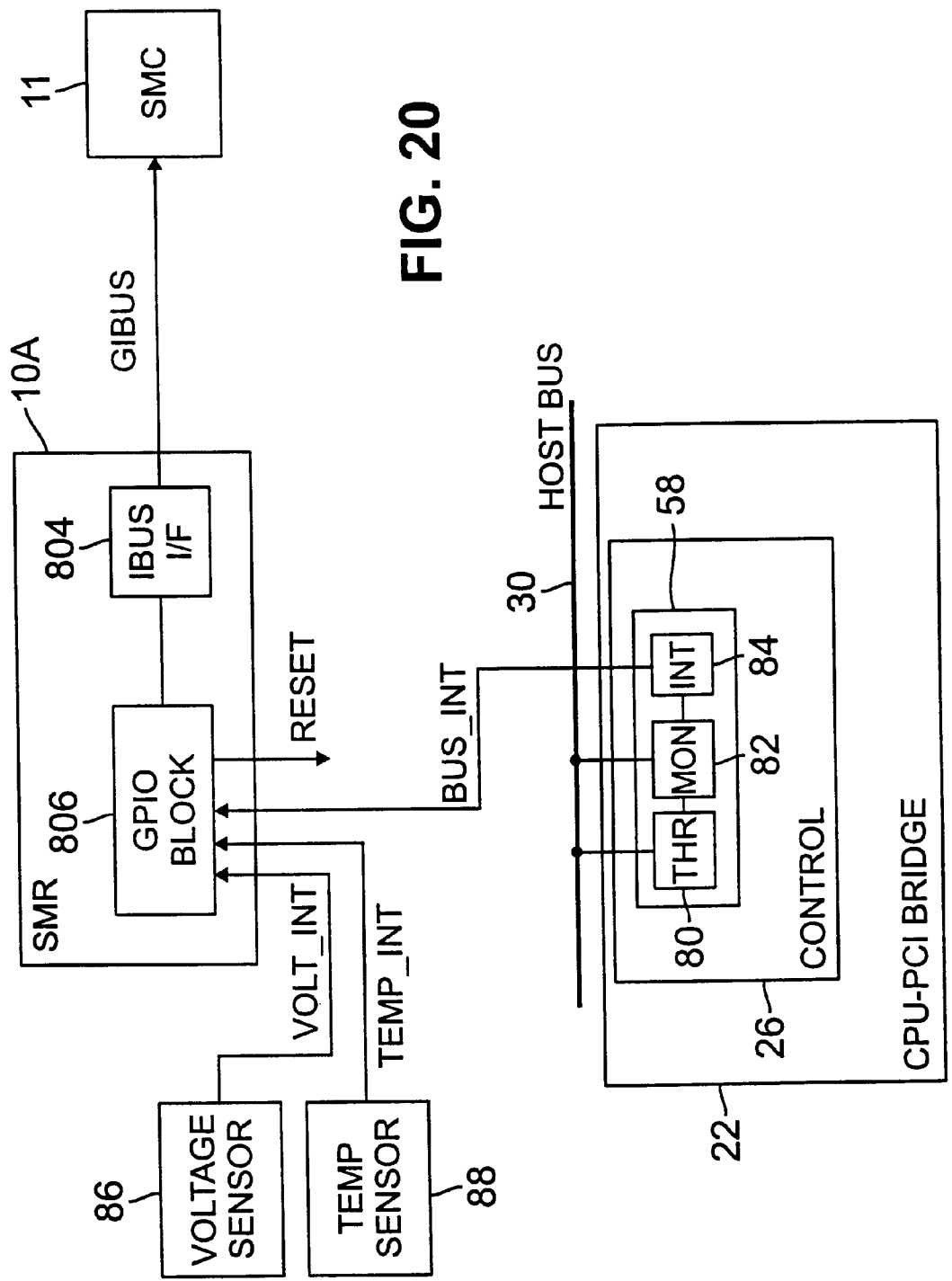
FIG. 20 is a block diagram of circuitry for detecting error on a host bus.

Referring to FIG. 20, the SMR 10A receives interrupt signals VOLT_INT, TEMP_INT, and BUS_INT from a voltage sensor 86, a temperature sensor 88, and the host bus watcher 58, at GPIO input pins I/O[2], I/O[1], and I/O[0], respectively. To enable detection of these interrupt signals, the interrupt register 868F of the GPIO block 806 is programmed to the hexadecimal value 0007 (i.e., signals INTENBL0[2:0] are set high). Thus, if any of the signals VOLT_INT, TEMP_INT, or BUS_INT is asserted low, the GPIO block 806 will report the interrupt as GPIO13_INT to the IBUS interface 804, which sends the interrupt to the SMC 11 over the bus GIBUS. The interrupt mapping block 514 (FIG. 9A) maps GPIO13_INT to the interrupt signal HOST2SMPINT, which in turn causes the signal SM_IRQ13 to be asserted to the SMP 14.

The voltage sensor 86 monitors the voltage lines of the CPU card 28A for glitches over a threshold level (e.g., glitch having a peak magnitude greater than about 6 volts) and the temperature sensor 88 monitors the temperature inside the computer system S for a high temperature condition (e.g., greater than about 110° F.). The threshold levels are programmed by the system BIOS to determine what temperature levels or voltage levels would trigger an interrupt to the associated SMR 10.

The host bus watcher 58 in the CPU-PCI bridge 22 monitors the host bus 30 for error conditions. One of the error conditions is a bus hang condition, which can be detected by a "dead-man" timer 80. Another error condition occurs on the host bus 30 when illegal signal conditions occur, such as, for example, when a ready indication signal RDY_ on the bus "hangs" or has not changed state after a predetermined period of time, illegal combinations of signals are detected, or other defined illegal conditions are detected.

Such illegal signal conditions are referred to as bus protocol violations. A bus protocol violation is detected by a bus monitor block 82. If either the dead-man timer 80 or the bus monitor 82 detects an error condition, an interrupt generator 84 in the host bus watcher 58 asserts the interrupt signal BUS_INT.

As the interrupt signals VOLT_INT, TEMP_INT, and BUS_INT are all routed to the same GPIO interrupt GPIO13_ INT, the SMM diagnostic software 224 must determine which source caused the interrupt. The SMM diagnostic software 224 can instruct the SMC 11 to retrieve information stored in the SMR 10A over the JTAG bus. By generating a JTAG read cycle, the SMC 11 can read the contents of the edge read register 868E in the GPIO block 806 to determine which source caused the interrupt.

All the temperature sensors in the computer system S are grouped together to drive a single status bit to form the interrupt signal TEMP_INT. If the SMM diagnostic software 224 determines that the interrupt source is a high temperature condition, then SMM diagnostic software 224 disables the interrupt source for all temperature sensors (by clearing the bit INTENBL0[1] in the SMR 10A) before taking corrective action (e.g., shutting the computer system down).

In addition, the output pin I/O[15] from the GPIO block 806 in the SMR 10A corresponds to a reset signal PRESET provided to the CPU-PCI bridge 22. After the SMM diagnostic software 224 has determined the source of the interrupt, it can instruct the SMC 11 to perform a JTAG write cycle on the JTAG bus to the SMR 10A to write a high value to bit ASSERT1[7] of the assert register 868A. This causes the pin I/O[15], and therefore the signal PRESET, to be asserted high, which resets the host bus 30 to a known condition to resume normal operation after the reset signal PRESET is negated. The SMM diagnostic software 224 can also decide to maintain the signal PRESET high to maintain the host bus 30 disabled while the SMM diagnostic 224 notifies a service provider of the host bus error condition.

The other SMRs 10 similarly can be connected to their respective interrupt sources to receive interrupts and to notify the SMC 11 of the interrupts. For example, fan-spin sensors and power supply sensors are connected to the other SMRs 10.

Fan sensor threshold interrupt and monitoring is similar to that of the temperature sensors. However, a separate status bit exists for each fan so that a failed fan can be identified. The four power supply modules 40 each have a separate status bit provided to the SMR 10D.

Other embodiments are within the scope of the following claims. For example, the system management module can include a PCI or EISA bus instead of the ISA bus. Additional registers or storage devices can be included in each SMR to store additional information associated with a faulty device. Each of the buses shown in the embodiment described can be substituted with buses of other protocols. The SMP can be implemented with other types of microprocessors, such as an 80X86, Pentium P5, or Pentium Pro processor from Intel Corporation or a RISC processor.

What is claimed is:

1. A computer system comprising:
   circuits;
   a fault management system connected to independently detect fault states of respective ones of the circuits and to associate the fault states with the respective ones of the circuits, the fault management system including:
   fault detectors associated with the respective circuits and configured to detect faulty operation of and to generate fault state information for the respective circuits; and
   a central manager connected to accumulate the fault state information from the fault detectors;
   a JTAG bus between each fault detector and the central manger over which information associated with the faulty operation is gathered; and
   the computer system including a mass storage device accessible by the fault management system.

2. The computer system of claim 1, wherein the fault management system includes a system manager connected to identify which of the circuits is causing faulty operation in the computer system.

3. The computer system of claim 2, wherein the fault detectors provide indications to the central manager to indicate faulty operation of the respective circuits.

4. The computer system of claim 3, wherein the indications include interrupt signals transmitted between the fault detectors and the central manager.

5. The computer system of claim 1, wherein at least one fault detector monitors more than one circuit.

6. The computer system of claim 1, wherein one of the circuits includes multiple modules, and wherein the fault management system further identifies fault states of the multiple modules.

7. The computer system of claim 1, wherein one of the circuits includes a bus, and the fault state includes a bus error condition.

8. A computer system comprising:
   circuits;
   fault detectors connected to detect fault states of respective circuits; and
   a fault manager to associate the fault states with the respective circuits, including:
   a central manager connected to accumulate fault state information from the fault detectors,
   wherein the fault detectors provide interrupts to the central manager to indicate a faulty operation of the respective circuits.

9. The computer system of claim 8, wherein at least one fault detector monitors more than one circuit.

10. The computer system of claim 8, wherein the fault detectors associated with the respective circuits are configured to detect faulty operation of and to generate fault state information for the respective circuits.

11. The computer system of claim 10, wherein the fault manager includes a system manager connected to identify which of the circuits is causing faulty operation in the computer system.

12. The computer system of claim 8, further comprising:
a serial bus over which the interrupt signals are transmitted.

13. The computer system of claim 12, wherein the interrupt signals are time-multiplexed onto the serial bus.

14. The computer system of claim 8, wherein the bus includes an EISA bus.

15. The computer system of claim 8, wherein the bus includes an ISA bus.

16. The computer system of claim 8, wherein the bus includes a PCI bus.

17. The computer system of claim 8, wherein the bus includes a host bus.

18. The computer system of claim 8, wherein the bus error condition includes a bus timeout condition.

19. The computer system of claim 8, wherein the bus error condition includes a lack of a refresh cycle in a predetermined amount of time.

20. The computer system of claim 8, wherein one of the circuits includes multiple modules, and wherein the fault manager further identifies fault states of the multiple modules.

21. The computer system of claim 20, wherein the modules include state machines.

22. The computer system of claim 8, wherein one of the circuits includes an internal clock, and wherein the fault state of the circuit includes the internal clock not functioning properly.

23. The computer system of claim 8, wherein one of the circuits includes a temperature sensor, and wherein the fault state of the circuit includes a high temperature condition detected by the temperature sensor.

24. The computer system of claim 8, wherein the fault detectors provide interrupt signals to indicate faulty operation of the respective circuits, and wherein at least one of the fault detectors include:
a monitor for detecting faulty operation and providing an indication if such faulty operation is detected; and
a device for receiving the indication and transmitting an interrupt signal to the fault manager.

25. The computer system of claim 24, wherein the device includes input pins, and the device is operable to receive the indication at any one of the input pins.

26. The computer system of claim 24, wherein the device provides multiple interrupt signals, and the device is operable to map receipt of the indication to any one of the interrupt signals.

27. The computer system of claim 26, further comprising:
a serial bus, wherein the interrupt signals are time-multiplexed into time slots on the serial bus, and wherein the device is operable to transmit receipt of the indication to any one of the time slots.

28. The computer system of claim 27, wherein more than one fault detector is connected to the serial bus.

29. The computer system of claim 8, wherein one of the circuits includes a bus, and the fault state includes a bus error condition.

30. The computer system of claim 29, wherein the bus is connected to multiple devices, and wherein the fault manager identifies which of the multiple devices caused the bus error condition.

31. A method of managing faults in a computer system having circuits, comprising:
providing a fault detector to independently detect faulty operation of the respective circuits;
connecting the fault detector to a central manager with a JTAG bus;
the fault detector independently detecting faulty operation of the respective circuits;
the fault detector generating fault state information for the respective circuits;
the fault detector providing interrupts to the central manager to indicate detection of faulty operation of the respective circuits;
the central manager accumulating the fault state information; and
the central manager identifying the fault states of the respective circuits based on the fault state information.

32. The method of claim 31, wherein one of the circuits includes multiple modules, the method further comprising:
identifying which of the multiple modules caused the faulty operation.

33. The method of claim 31, wherein one of the circuits include a bus connected to multiple devices, and the respective fault state includes a bus error condition, the method further comprising:
identifying which of the multiple devices caused the bus error condition.

34. Apparatus for managing faults in a computer system, the computer system having circuits and a bus for connecting to multiple devices, comprising:
fault detectors connectable to detect fault states of respective circuits and bus error conditions of the bus; and
a fault manager connectable to the computer system and to each fault detector to associate the fault states with the respective circuits, the bus and the multiple devices,
wherein the fault detector and fault manager are connectable via a JTAG bus, the JTAG bus being configured to communicate fault state information and bus error information.

35. The apparatus of claim 34, wherein the fault manager includes a system manager connected to identify which of the circuits is causing faulty operation in the computer system.

36. The apparatus of claim 34, wherein the fault detectors associated with the respective circuits are configured to detect faulty operation of and to generate fault state information for the respective circuits.

37. The apparatus of claim 36, wherein the fault manager further includes:
a central manager connected to accumulate fault state information from the fault detectors.

* * * * *